(12) United States Patent
Suezawa et al.

(10) Patent No.: US 11,042,268 B2
(45) Date of Patent: Jun. 22, 2021

(54) DOCUMENT DISPLAY DEVICE

(71) Applicant: FUJIFILM BUSINESS INNOVATION CORP., Tokyo (JP)

(72) Inventors: Yoshihito Suezawa, Kanagawa (JP); Toshiyuki Komoda, Kanagawa (JP); Shinsuke Nakazawa, Kanagawa (JP); Taro Yoshihama, Kanagawa (JP); Masahiro Yamada, Kanagawa (JP); Jun Ohashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 48 days.

(21) Appl. No.: 15/688,078

(22) Filed: Aug. 28, 2017

(65) Prior Publication Data
US 2018/0217726 A1 Aug. 2, 2018

(30) Foreign Application Priority Data

Feb. 2, 2017 (JP) .............................. JP2017-017348

(51) Int. Cl.
*G06F 3/048* (2013.01)
*G06F 3/0483* (2013.01)
(Continued)

(52) U.S. Cl.
CPC .......... *G06F 3/0483* (2013.01); *G06F 3/0482* (2013.01); *G06F 3/0485* (2013.01); *G06F 3/0487* (2013.01); *G06F 40/106* (2020.01)

(58) Field of Classification Search
CPC .... G06F 3/0483; G06F 3/0482; G06F 3/0485; G06F 3/0487; G06F 17/212; G06F 40/106
See application file for complete search history.

(56) References Cited

U.S. PATENT DOCUMENTS 7,266,768 B2 * 9/2007 Ferlitsch ............. G06F 3/04815
715/273
2004/0205641 A1 * 10/2004 Shimizu ................ G06F 17/212
715/274

(Continued)

FOREIGN PATENT DOCUMENTS

JP 2007-503663 A 2/2007
JP 2013-41459 A 2/2013

(Continued)

OTHER PUBLICATIONS

Jan. 26, 2021 Office Action issued in Japanese Patent Application No. 2017-017348.

(Continued)

*Primary Examiner* — Haoshian Shih
(74) *Attorney, Agent, or Firm* — Oliff PLC

(57) ABSTRACT

A document display device includes a controller. The controller controls a display for displaying document data constituted by plural pages. The controller controls the display to display pieces of content of at least two consecutive pages of the document data side by side and to display one or more of content-displayed pages, which are the pages for which the pieces of content of the pages are displayed side by side, and one or more of pages other than the content-displayed pages among the plural pages so as to overlap.

13 Claims, 28 Drawing Sheets

(51) Int. Cl.
*G06F 3/0482* (2013.01)
*G06F 3/0485* (2013.01)
*G06F 3/0487* (2013.01)
*G06F 40/106* (2020.01)

(56) References Cited

U.S. PATENT DOCUMENTS

| | | | | |
|---|---|---|---|---|
| 2004/0263907 | A1* | 12/2004 | Hiraki | G06F 17/217 |
| | | | | 358/1.18 |
| 2007/0139707 | A1* | 6/2007 | Takami | H04N 1/00411 |
| | | | | 358/1.15 |
| 2007/0273895 | A1* | 11/2007 | Cudd | G06F 3/1208 |
| | | | | 358/1.1 |
| 2008/0180700 | A1* | 7/2008 | Miyata | G06F 17/211 |
| | | | | 358/1.6 |
| 2011/0317195 | A1* | 12/2011 | Mitsui | G06F 3/0483 |
| | | | | 358/1.13 |
| 2012/0236336 | A1* | 9/2012 | Morita | G06F 3/1204 |
| | | | | 358/1.9 |
| 2013/0007601 | A1* | 1/2013 | Grams | G06T 11/60 |
| | | | | 715/247 |
| 2014/0380152 | A1* | 12/2014 | Noguchi | G06F 17/212 |
| | | | | 715/243 |
| 2015/0066165 | A1* | 3/2015 | Everette | G06F 3/0482 |
| | | | | 700/83 |
| 2017/0351208 | A1* | 12/2017 | Nemoto | G03G 15/01 |

FOREIGN PATENT DOCUMENTS

| | | |
|---|---|---|
| JP | 2015-519655 A | 7/2015 |
| WO | 2004/068303 A2 | 8/2004 |
| WO | 2013/137239 A1 | 9/2013 |
| WO | 2013/169870 A1 | 11/2013 |

OTHER PUBLICATIONS

Apr. 20, 2021 Office Action issued in Japanese Patent Application No. 2017-017248.

\* cited by examiner

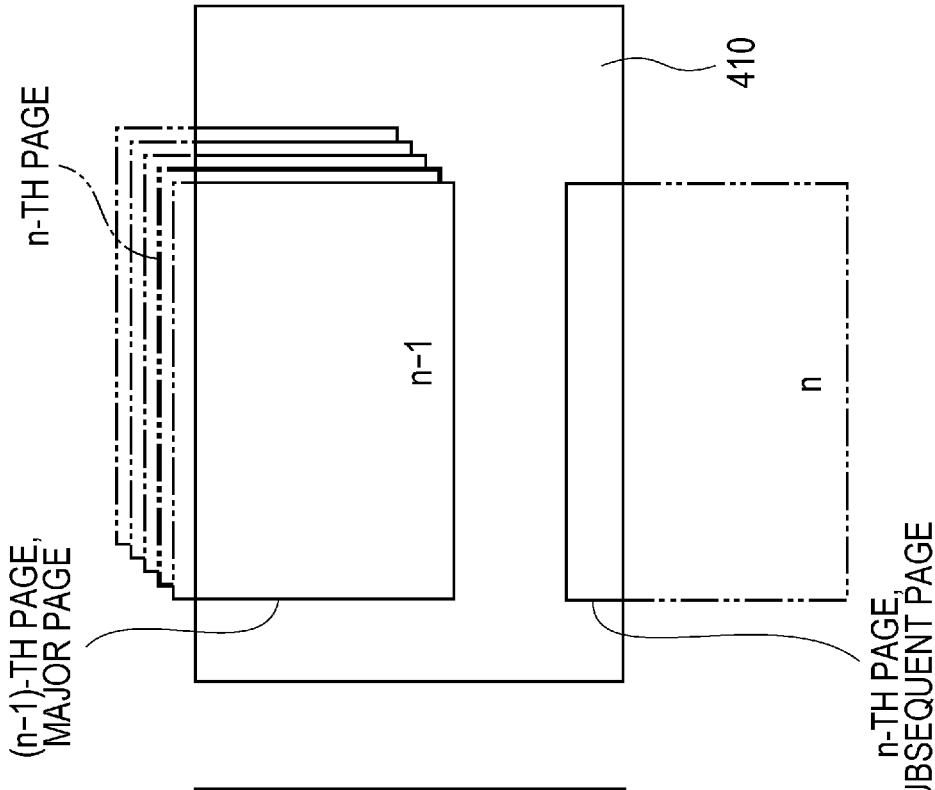
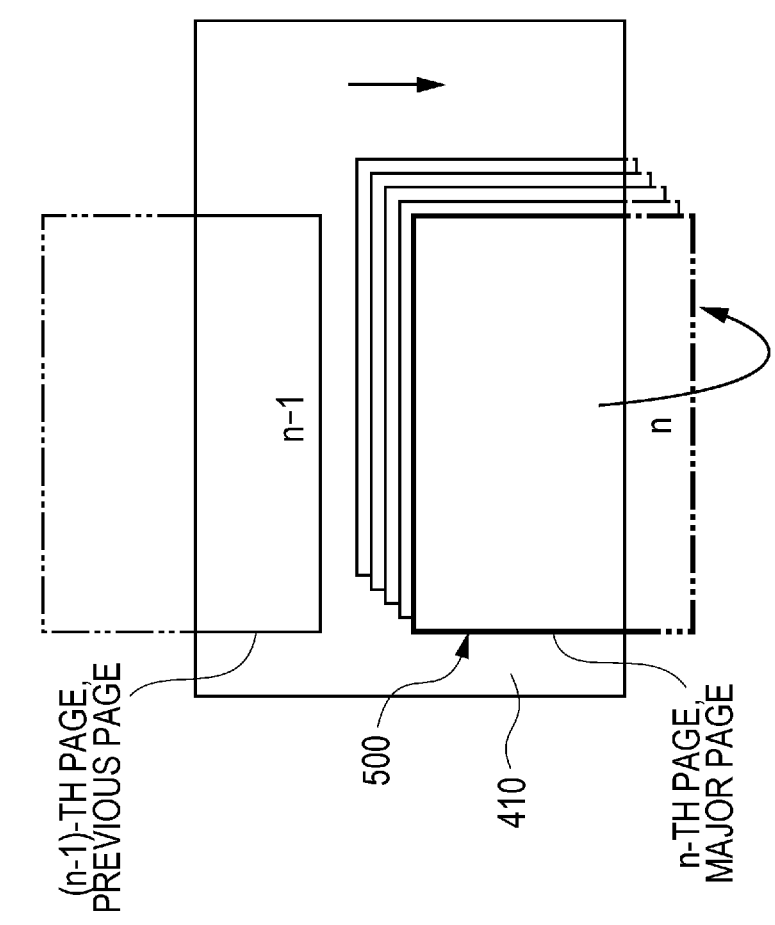

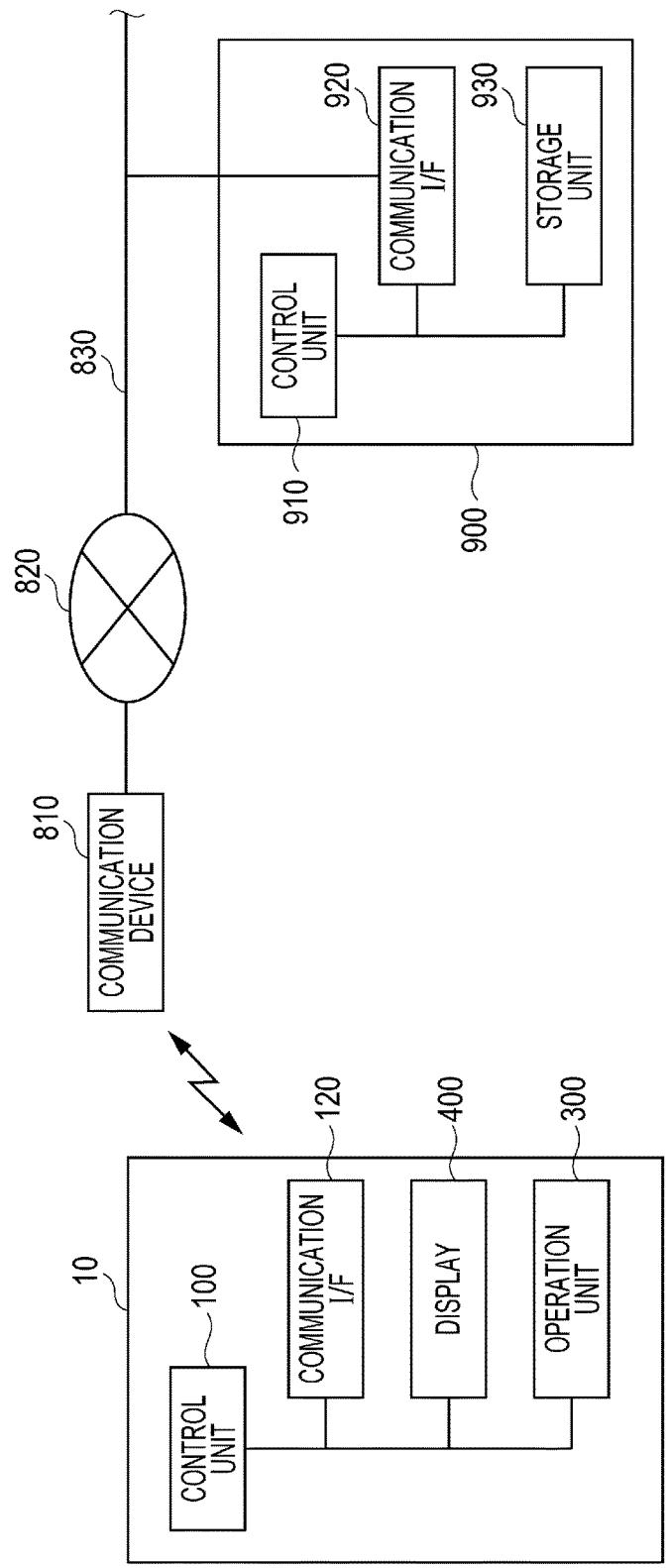

US 11,042,268 B2

DOCUMENT DISPLAY DEVICE

CROSS-REFERENCE TO RELATED APPLICATIONS

This application is based on and claims priority under 35 USC 119 from Japanese Patent Application No. 2017-017348 filed Feb. 2, 2017.

BACKGROUND

Technical Field

The present invention relates to a document display device.

SUMMARY

According to an aspect of the invention, there is provided a document display device including a controller. The controller controls a display for displaying document data constituted by plural pages. The controller controls the display to display pieces of content of at least two consecutive pages of the document data side by side and to display one or more of content-displayed pages, which are the pages for which the pieces of content of the pages are displayed side by side, and one or more of pages other than the content-displayed pages among the plural pages so as to overlap.

BRIEF DESCRIPTION OF THE DRAWINGS

Exemplary embodiments of the present invention will be described in detail based on the following figures, wherein:

FIG. 19A is a diagram illustrating a display area before movement of a page and FIG. 19B is a diagram illustrating the display area after movement of the page;

FIGS. 20A and 20B include a second set of diagrams for describing movement of pages associated with, for example, display scrolling, where FIG. 20A is a diagram illustrating a display area before movement of a page and FIG. 20B is a diagram illustrating the display area after movement of the page;

FIG. 26A is a diagram illustrating an example of display in a display area in a case of not moving labels and FIG. 26B is a diagram illustrating an example of display in the display area in a case of moving the labels;

FIG. 28 is a diagram illustrating a hardware configuration of a control device and a hardware configuration of the document display device illustrated in FIG. 27.

DETAILED DESCRIPTION

Figure 1:
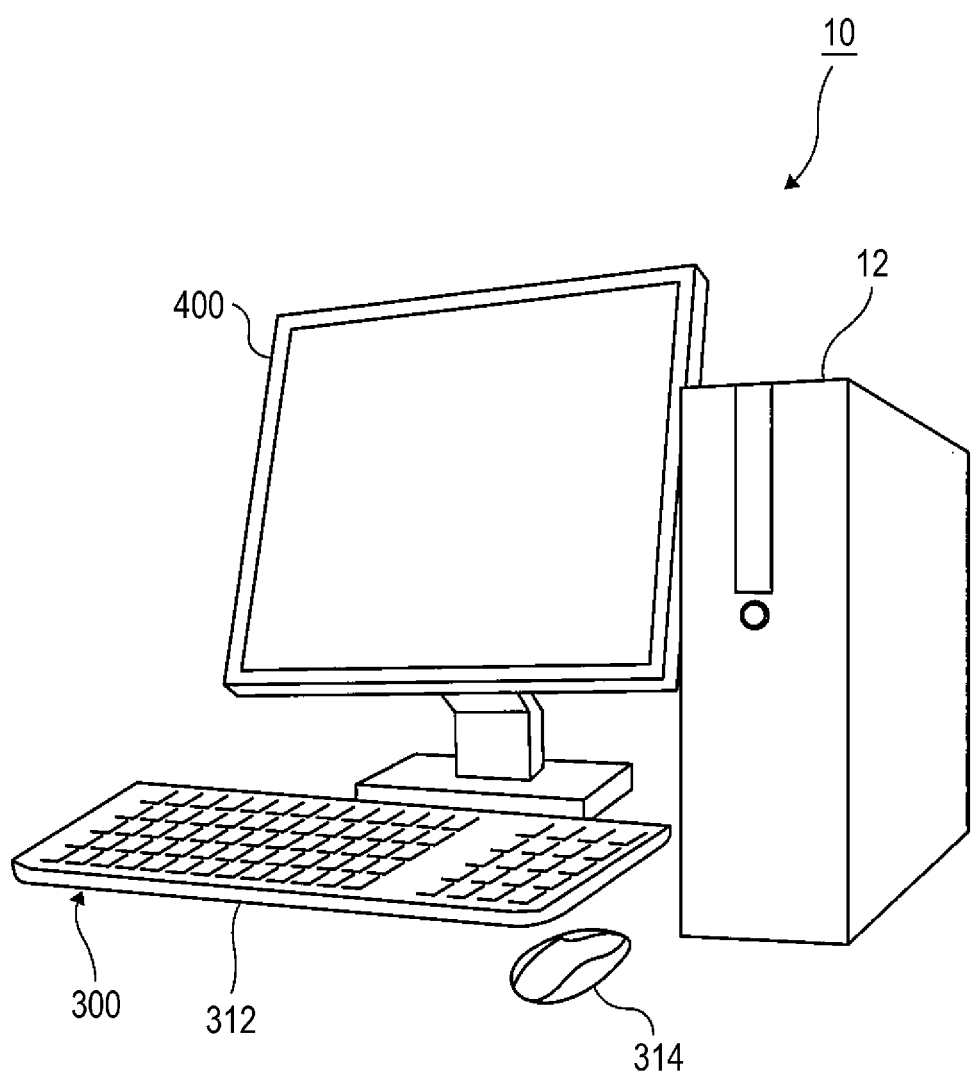
FIG. 1 is a diagram illustrating an external view of a document display device according to a first exemplary embodiment of the present invention.

Hereinafter, exemplary embodiments of the present invention will be described with reference to the drawings. FIG. 1 illustrates a document display device 10 according to a first exemplary embodiment of the present invention. As illustrated in FIG. 1, the document display device 10 includes a document display device system unit 12, an operation unit 300, and a display 400.

As the document display device 10, it is possible to use, for example, a personal computer. As the operation unit 300, it is possible to use, for example, a keyboard 312 or a mouse 314. As the display 400, it is possible to use, for example, a liquid crystal display device. The document display device 10 may be, for example, a laptop computer, a smartphone, or a tablet terminal into which the document display device system unit 12, the operation unit 300, and the display 400 are integrated.

Figure 2:
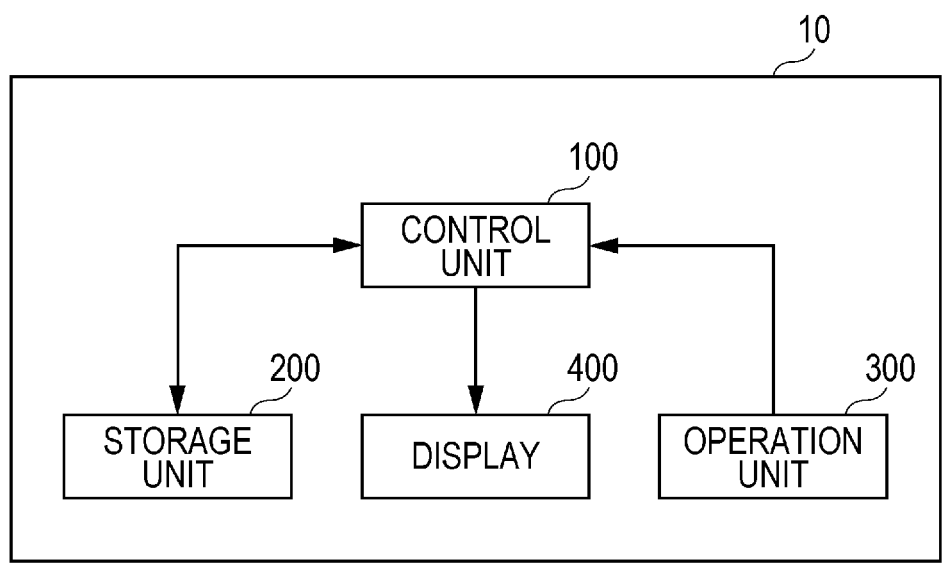
FIG. 2 is a diagram illustrating a hardware configuration of the document display device illustrated in FIG. 1.

FIG. 2 illustrates a hardware configuration of the document display device 10. As illustrated in FIG. 2, the document display device 10 includes a control unit 100, a storage unit 200, the operation unit 300 described above, and the display 400 described above.

The control unit 100 is used as a controller, includes, for example, an arithmetic processing unit, such as a central processing unit (CPU), and a memory, namely, a main memory, and executes a program to control the operations of each unit of the document display device 10. The storage unit 200 stores the program used by the control unit 100 in processing, data of documents to be displayed, and so on. As the storage unit 200, it is possible to use, for example, a hard disk or a flash memory.

Figure 3:
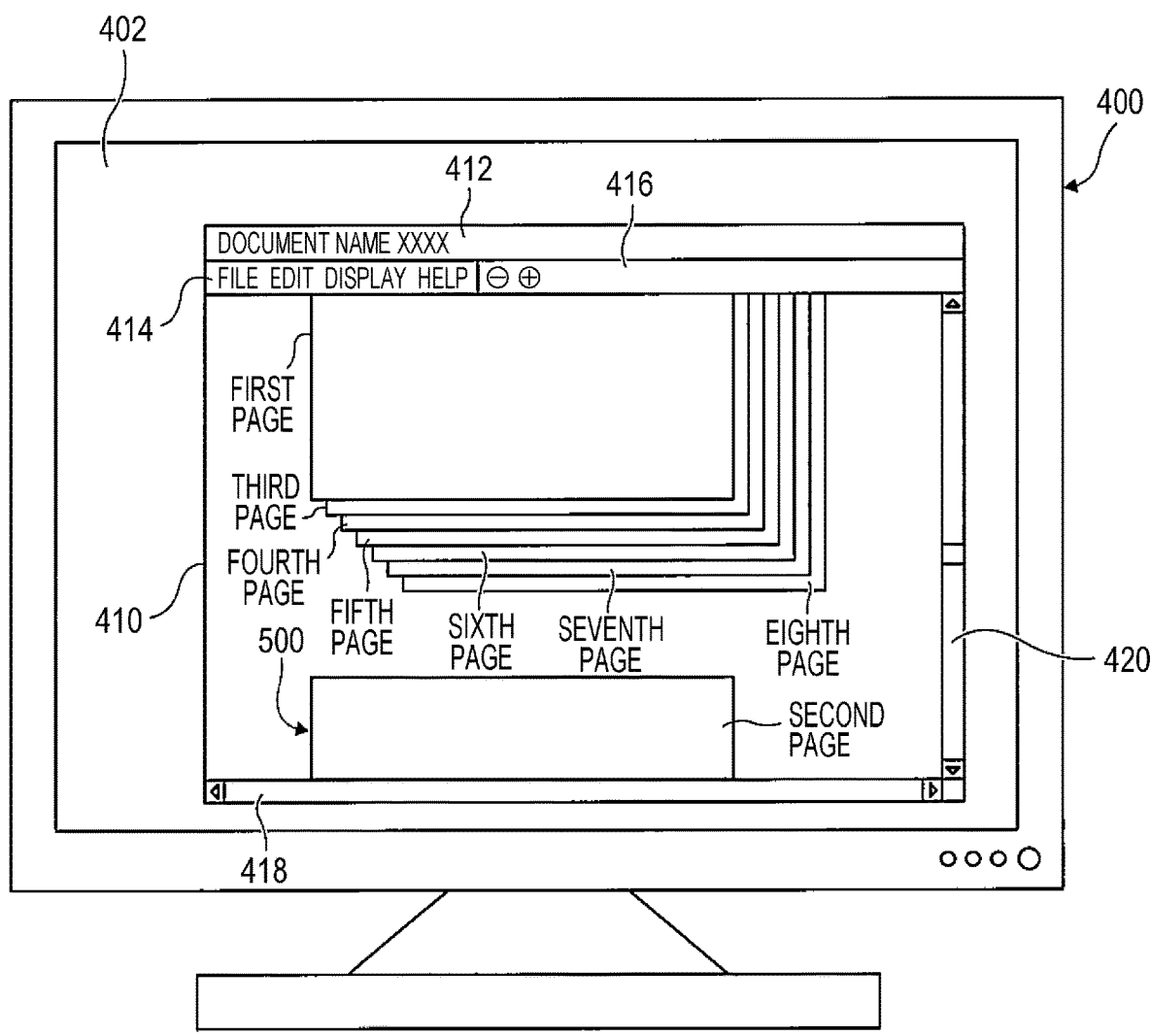
FIG. 3 is a diagram illustrating a display included in the document display device illustrated in FIG. 1.

FIG. 3 illustrates the display 400. As illustrated in FIG. 3, the display 400 includes a display screen 402. On the display screen 402, a display area 410 is displayed. The display area 410 is an area in which an application for displaying document data 500 described below is displayed. Further, the display area 410 is an area for operating the application for displaying the document data 500 and is also called a viewer.

In the display area 410, the document data 500 constituted by plural pages is displayed. The document data 500 includes, for example, pages stored in the storage unit 200. Here, a page is a display area for displaying the document data 500 and refers to a portion outlined by a peripheral edge. In the example illustrated in FIG. 3, the document data 500 includes eight pages from a first page to an eighth page. In the following description, it is assumed that the document data 500 includes K pages from a first page to a K-th page except for a case where the number of pages is specifically indicated.

Around the display area 410, a document name display bar 412, a menu bar 414, a tool bar 416, a horizontal scroll bar 418, and a vertical scroll bar 420 are arranged and displayed.

In the document name display bar 412, the name (file name) of the document data 500 is displayed. The menu bar 414 is used in operations, such as saving and editing the document data 500, changing the display format, displaying help information, and so on. The tool bar 416 is used in operating the document data 500 that is being displayed, such as enlarging or reducing the displayed document data 500.

It is possible to move, enlarge, and reduce the document data 500 within the display area 410 in accordance with an operation by an operator. More specifically, an operator is able to operate the horizontal scroll bar 418 and the vertical scroll bar 420 to horizontally and vertically move the document data 500, and an operator is able to operate the tool bar 416 to enlarge and reduce the document data 500.

It is possible to move the display area 410 on the display screen 402 in accordance with an operation by an operator and to enlarge and reduce the display area 410 on the display screen 402 in accordance with an operation by an operator. The document name display bar 412, the menu bar 414, the tool bar 416, the horizontal scroll bar 418, and the vertical scroll bar 420 move on the display screen 402 together with the display area 410 and are enlarged and reduced on the display screen 402.

In the example illustrated in FIG. 3, the first page and the second page, which are consecutive pages, of the document data 500 are displayed side by side in the display area 410. More specifically, the first page and the second page are displayed side by side such that the first page is positioned on the upper side and the second page is positioned on the lower side. In the following description, pages, such as the first page and the second page described above, which are displayed side by side and for which the content is displayed are called "content-displayed pages".

In the example illustrated in FIG. 3, the third to eighth pages, which are pages other than the content-displayed pages among the plural pages that constitute the document data 500, are displayed such that the first page and the third to eighth pages overlap. As described above, on the display 400, the first page and the second page, which are content-displayed pages, are displayed side by side, and the third to eighth pages, which are pages other than the content-displayed pages among the plural pages that constitute the document data 500, are displayed so as to overlap.

In the example illustrated in FIG. 3, the first page, which is one of the pages displayed side by side, and all of the third to eighth pages, which are pages that are displayed so as to overlap among the pages that constitute the document data 500, are displayed so as to overlap.

Note that, in this exemplary embodiment, the display 400 displays two pages to be displayed side by side by arranging the pages in the vertical direction such that the preceding page is positioned above the succeeding page; however, the display 400 may display pages to be displayed side by side by arranging the pages in the vertical direction such that the succeeding page is positioned above the preceding page. Alternatively, the display 400 may display pages to be displayed side by side by arranging the pages in the horizontal direction such that the preceding page is positioned to the left of the succeeding page or by arranging the pages in the horizontal direction such that the preceding page is positioned to the right of the succeeding page.

Figure 4:
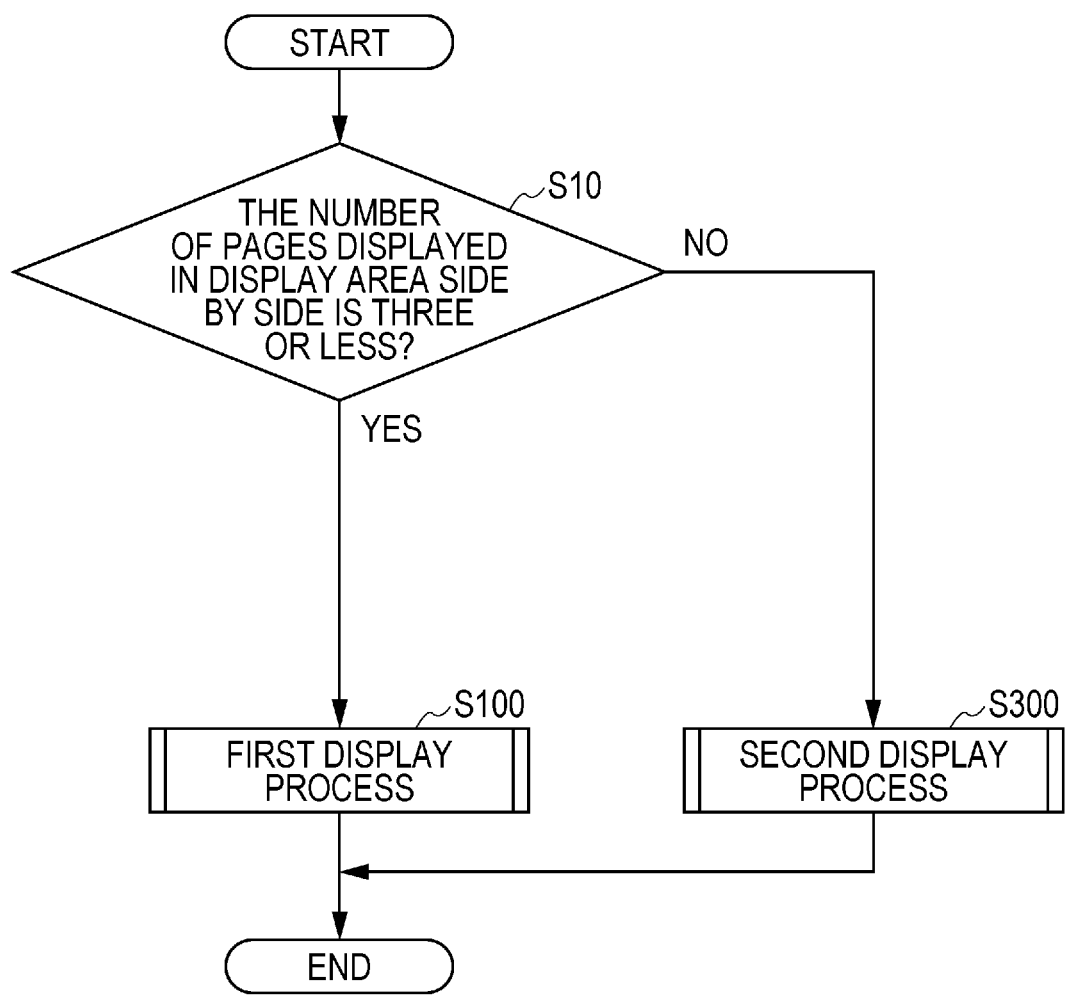
FIG. 4 is a first flowchart illustrating operations of the document display device illustrated in FIG. 1.

FIG. 4 is a first flowchart for describing operations of the document display device 10.

In a case of newly displaying the document data 500 or in a case of moving the displayed document data 500 within the display area 410 or enlarging/reducing the document data 500 within the display area 410, the control unit 100 starts a series of control operations. First, in step S10, the control unit 100 determines whether the number of pages (content-displayed pages) for which the content of the document data 500 is displayed in the display area 410 and which are displayed side by side is three or less.

The control unit 100 determines whether the number of content-displayed pages is three or less on the basis of the number of pixels of the display area 410 in the vertical direction, the number of pixels of each page, in the vertical direction, displayed in the display area 410, and the number of pixels of a gap, in the vertical direction, between pages adjacent to each other.

If the control unit 100 determines that the number of content-displayed pages displayed in the display area 410 side by side is three or less (Yes in step S10), the flow proceeds to step S100. If the control unit 100 determines that the number of content-displayed pages displayed in the display area 410 side by side is four or more (No in step S10), the flow proceeds to step S300.

In step S100, the control unit 100 controls the document display device 10 to perform a first display process. The first display process will be described in detail below with reference to FIG. 5.

In step S300, the control unit 100 controls the document display device 10 to perform a second display process. The second display process will be described in detail below with reference to FIG. 14.

Figure 5:
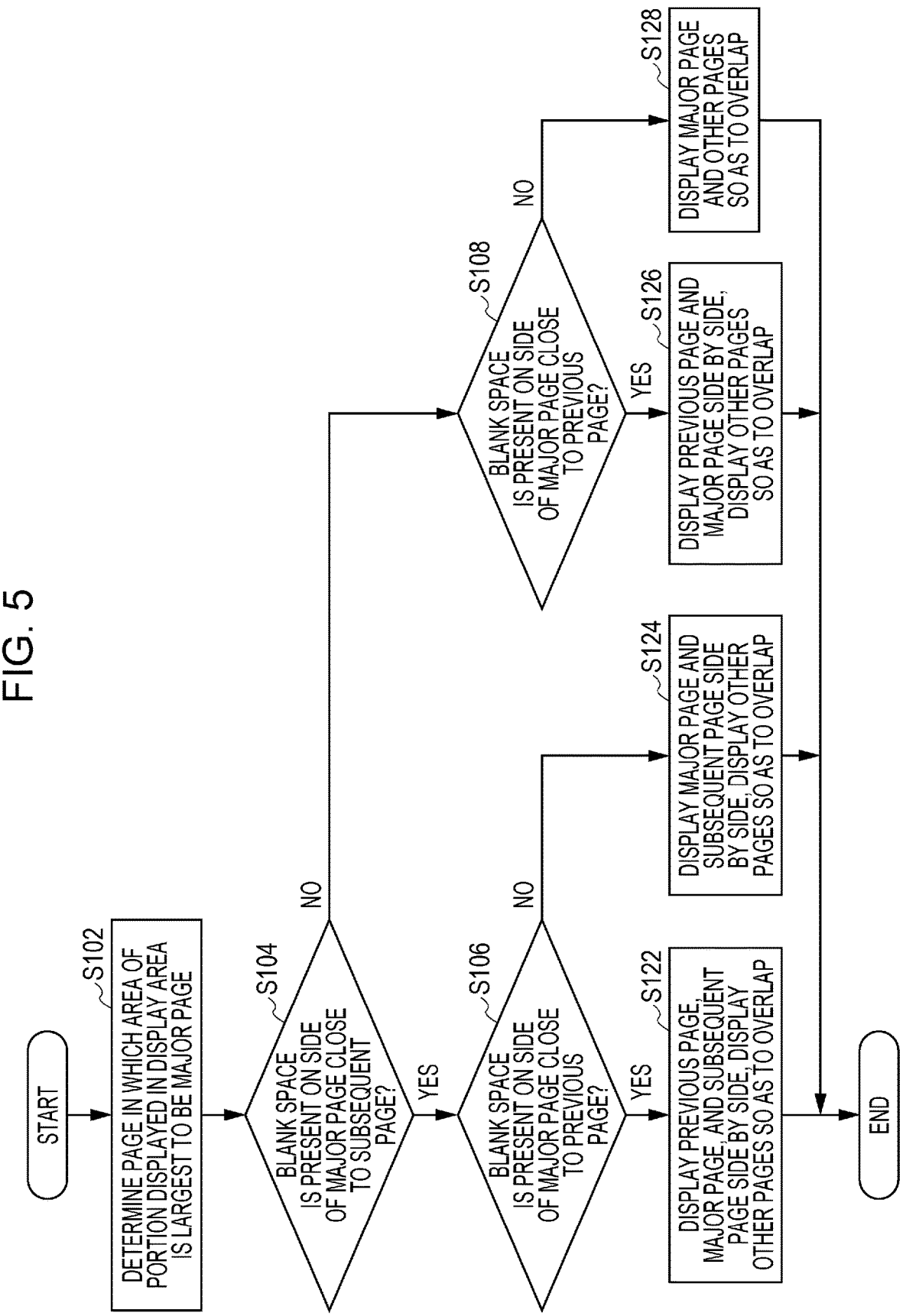
FIG. 5 is a second flowchart illustrating operations of the document display device illustrated in FIG. 1.
Figure 6:
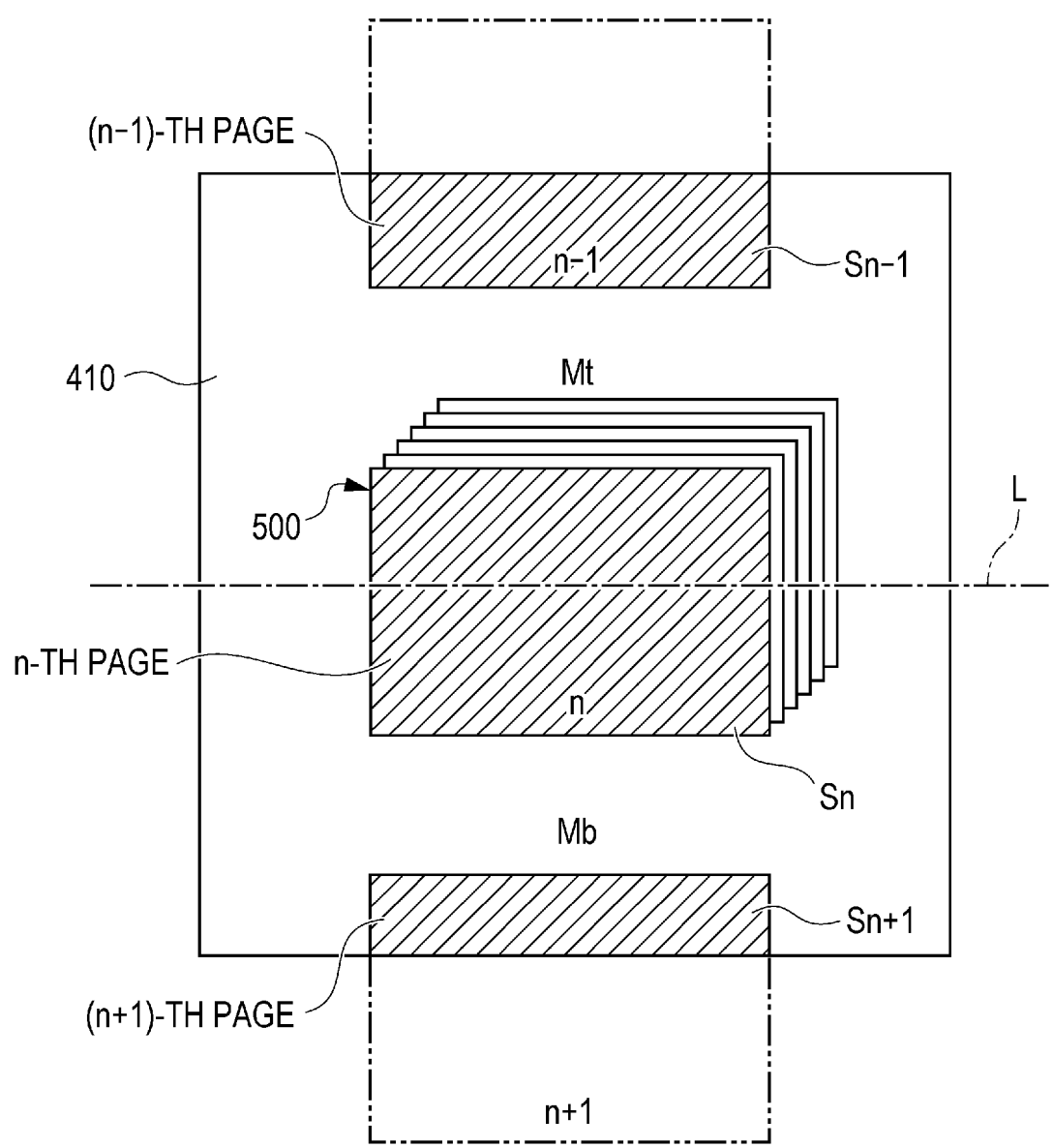
FIG. 6 is a diagram for describing selection of a major page.

FIG. 5 is a second flowchart for describing operations of the document display device 10 and is a flowchart for describing the first display process (see step S100 in FIG. 4). FIG. 6 is a diagram for supplementing description of the first display process. Note that, in FIG. 6 and other figures in which the display area 410 is illustrated, a page that constitutes the document data 500 may have a portion that is not displayed in the display area 410, and such a portion is indicated by an imaginary line (two-dot chain line) for convenience of description.

First, in step S102, the control unit 100 determines a page in which the area of a portion displayed in the display area 410 is largest to be a major page. That is, the control unit 100 determines a page in which a portion that is displayed in the display area 410 is largest among the content-displayed pages to be a major page.

For example, in the example illustrated in FIG. 6, an (n−1)-th page, an n-th page, and an (n+1) page of the document data 500 are displayed in the display area 410 side by side as content-displayed pages. Among the area $S_n$ of a portion of the n-th page that is displayed in the display area 410, the area $S_{n-1}$ of a portion of the (n−1)-th page that is displayed in the display area 410, and the area $S_{n+1}$ of a portion of the (n+1)-th page that is displayed in the display area 410, the area $S_n$ is largest, and therefore, the control unit 100 determines the n-th page to be a major page.

Instead of determining a major page as described above, the control unit 100 may determine a page among pages displayed side by side that is positioned closest to a line segment L, which is positioned at the center of the display screen 402 in a movement direction of the pages displayed side by side, to be a major page as in step S310 (see FIG. 14) described below. Here, the page that is closest to the line segment L may be a page that overlaps with the line segment L. The line segment L is used to only identify a major page and is not visibly displayed in the display area 410.

Next, in step S104, the control unit 100 determines whether an outside-page blank space Mb is present on a side of the n-th page, which is the major page, close to the (n+1)-th page, which is the subsequent page. If the outside-page blank space Mb is present (Yes in step S104), the flow proceeds to step S106. If the outside-page blank space Mb is not present (No in step S104), the flow proceeds to step S108.

For example, as illustrated in FIG. 6, if the outside-page blank space Mb is present on the side of the n-th page, which is the major page, close to the (n+1)-th page, which is the subsequent page, the flow proceeds to step S106.

In step S106, the control unit 100 determines whether an outside-page blank space Mt is present on a side of the n-th page, which is the major page, close to the (n−1) th page, which is the previous page. If the outside-page blank space Mt is present (Yes in step S106), the flow proceeds to step S122. If the outside-page blank space Mt is not present (No in step S106), the flow proceeds to step S124. For example, as illustrated in FIG. 6, if the outside-page blank space Mt is present between the n-th page, which is the major page, and the (n−1) th page, which is the previous page, the flow proceeds to step S122.

In step S108, the control unit 100 determines whether the outside-page blank space Mt is present on a side of the n-th page, which is the major page, close to the (n−1) th page, which is the previous page. If the outside-page blank space Mt is present (Yes in step S108), the flow proceeds to step S126. If the outside-page blank space Mt is not present (No in step S108), the flow proceeds to step S128.

In step S122, the control unit 100 performs control to display the previous page, which is the page immediately preceding the major page, the major page, and the subsequent page, which is the page immediately succeeding the major page, of the document data 500 in the display area 410 side by side. The control unit 100 performs control to display pages other than the previous page, the major page, and the subsequent page of the document data 500 such that one or more of the previous page, the major page, and the subsequent page and the other pages overlap.

In step S124, the control unit 100 performs control to display the major page and the subsequent page of the document data 500 in the display area 410 side by side. The control unit 100 performs control to display pages other than the major page and the subsequent page of the document data 500 such that one of the major page and the subsequent page and the other pages overlap.

In step S126, the control unit 100 performs control to display the previous page and the major page of the document data 500 in the display area 410 side by side. The control unit 100 performs control to display pages other than the previous page and the major page of the document data 500 such that one of the previous page and the major page and the other pages overlap.

In step S128, the control unit 100 performs control to display the document data 500 such that the major page and the other pages overlap.

Figure 7:
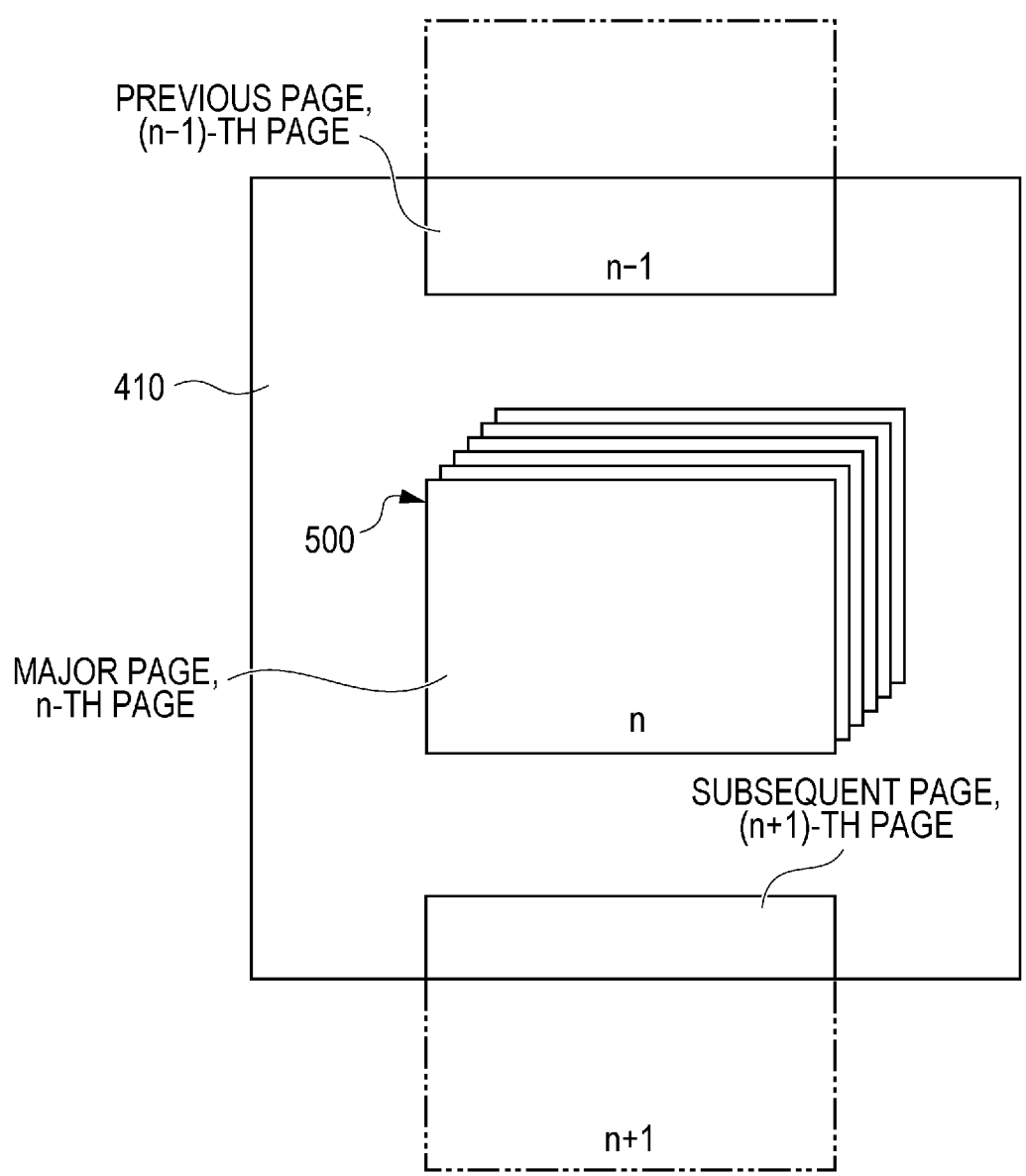
FIG. 7 is a diagram for describing a first example of display in a display area performed in a step in FIG. 5.

FIG. 7 illustrates a first example of display in the display area 410 performed in step S122 in FIG. 5. In this first example, the control unit 100 performs control to display the (n−1)-th page, which is the previous page, the n-th page, which is the major page, and the (n+1)-th page, which is the subsequent page, side by side and to display pages other than the pages displayed side by side such that the major page and the other pages overlap.

Figure 8:
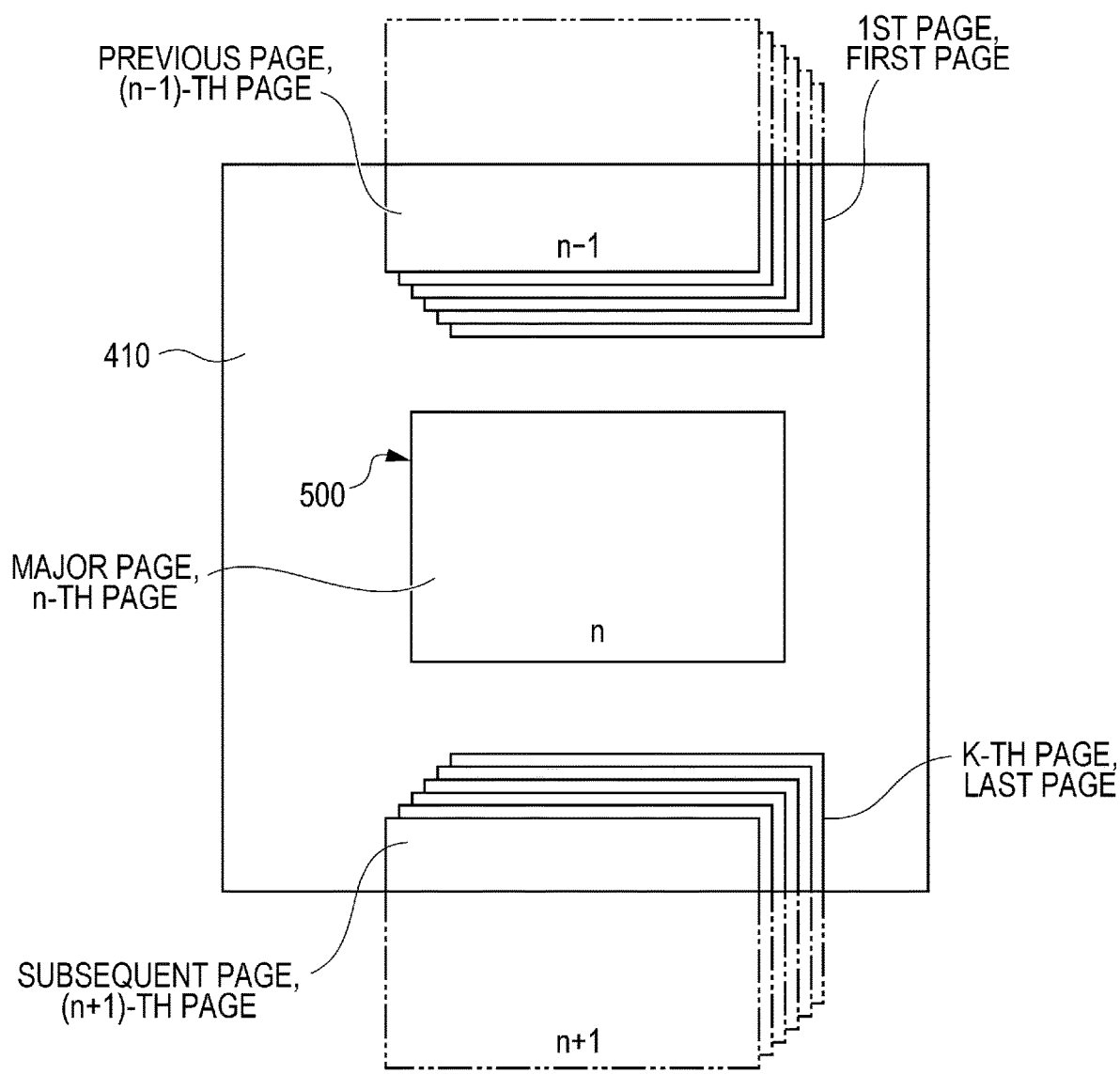
FIG. 8 is a diagram for describing a second example of display in a display area performed in the same step in FIG. 5.

FIG. 8 illustrates a second example of display in the display area 410 performed in step S122 in FIG. 5. In this second example, the control unit 100 performs control to display the (n−1)th page, which is the previous page, the n-th page, which is the major page, and the (n+1)-th page, which is the subsequent page, side by side, to group pages other than the pages displayed side by side into two groups, namely, a group of the (n−1)-th page, which is the previous page, and a group of the (n+1)-th page, which is the subsequent page, to display pages grouped into the group of the (n−1)-th page such that the (n−1)-th page and the pages grouped into the group of the (n−1)-th page overlap, and to display pages grouped into the group of the (n+1)-th page such that the (n+1)-th page and the pages grouped into the group of the (n+1)-th page overlap.

More specifically, the control unit 100 performs control to display the (n+1)-th page, which is the subsequent page, and pages that are other than the pages displayed side by side and that are subsequent to the (n+1)-th page, which is the subsequent page, so as to overlap. Further, the control unit 100 performs control to display the (n−1)-th page, which is the previous page, and pages that are other than the pages displayed side by side and that are previous to the (n−1)-th page, which is the previous page, so as to overlap.

Here, it is desirable to make a display format for displaying pages that are other than the pages displayed side by side and that are previous to the (n−1)-th page, the n-th page, and the (n+1)-th page, which are the pages displayed side by side, in the page order different from a display format for displaying pages that are other than the pages displayed side by side and that are subsequent to the (n−1)-th page, the n-th page, and the (n+1)-th page, which are the pages displayed side by side, in the page order.

More specifically, it is desirable to, for example, make the color of pages that are previous to the (n−1)-th page, the n-th page, and the (n+1)-th page, which are the pages displayed side by side, in the page order different from the color of pages that are other than the pages displayed side by side and that are subsequent to the (n−1)-th page, the n-th page, and the (n+1)-th page, which are the pages displayed side by side, in the page order. Alternatively, more specifically, it is desirable to, for example, display pages that are previous to the (n−1)-th page, the n-th page, and the (n+1)-th page, which are the pages displayed side by side, in the page order in color and to display pages that are other than the pages displayed side by side and that are subsequent to the (n−1)-th page, the n-th page, and the (n+1)-th page, which are the pages displayed side by side, in the page order in a gray scale.

Figure 9:
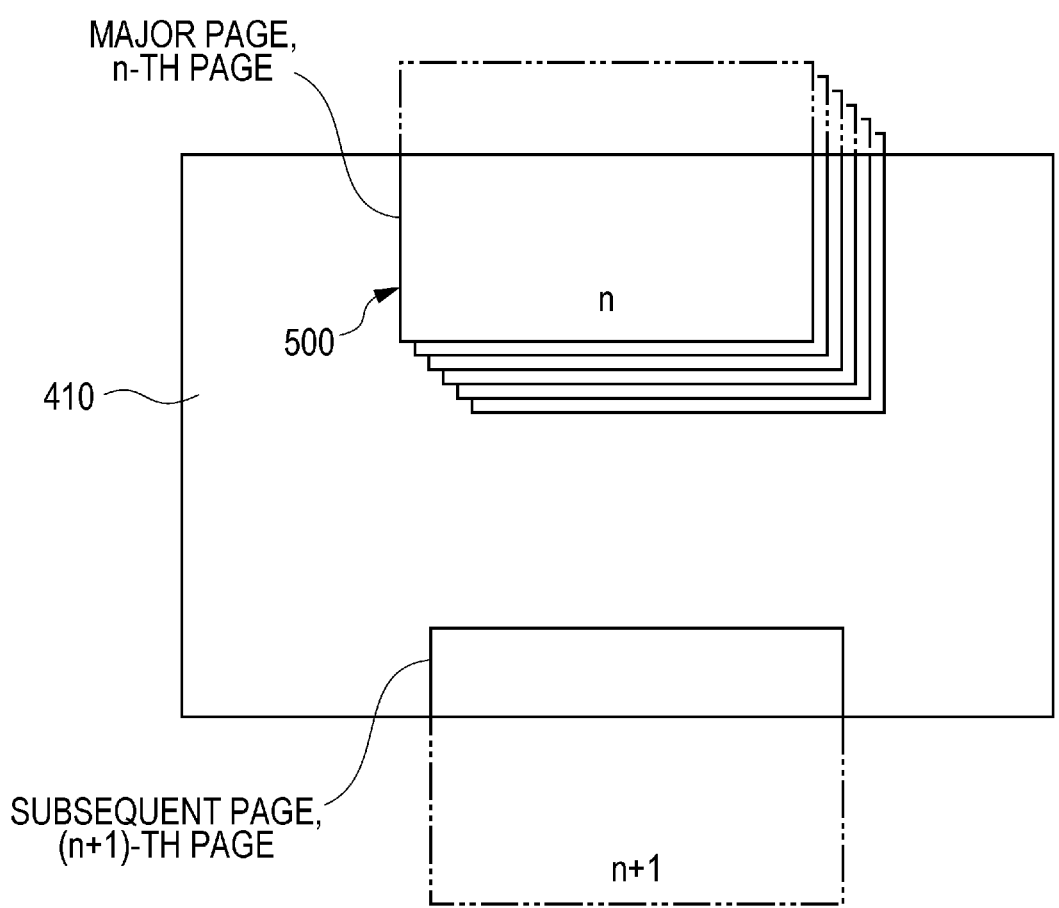
FIG. 9 is a diagram for describing a first example of display in a display area performed in a step in FIG. 5.

FIG. 9 illustrates a first example of display in the display area 410 performed in step S124 in FIG. 5. In this first example, the control unit 100 performs control to display the n-th page, which is the major page, and the (n+1)-th page, which is the subsequent page, side by side as content-displayed pages, and to display pages other than the pages displayed side by side such that the major page and the other pages overlap.

Figure 10:
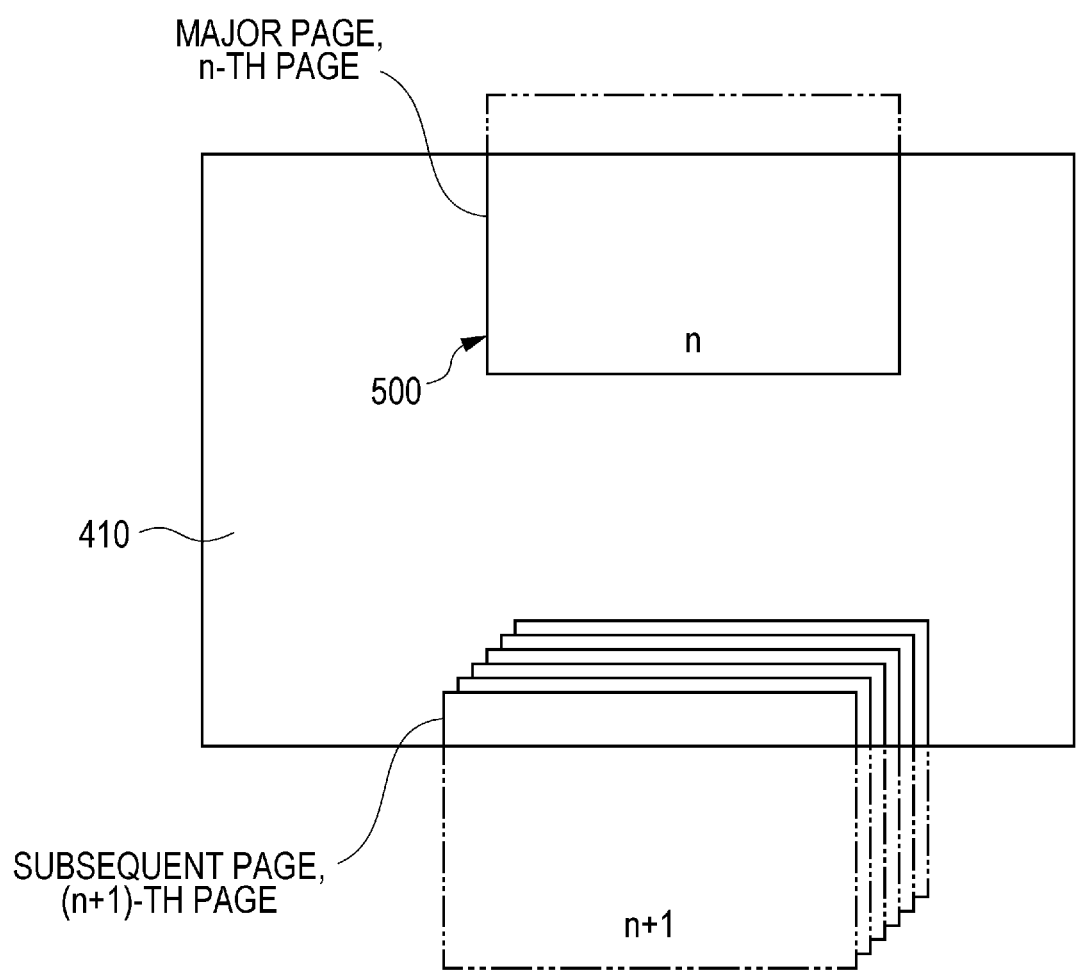
FIG. 10 is a diagram for describing a second example of display in a display area performed in the same step in FIG. 5.

FIG. 10 illustrates a second example of display in the display area 410 performed in step S124 in FIG. 5. In this second example, the control unit 100 performs control to display the n-th page, which is the major page, and the (n+1)-th page, which is the subsequent page, side by side, and to display pages other than the pages displayed side by side such that the subsequent page and the other pages overlap.

Figure 11:
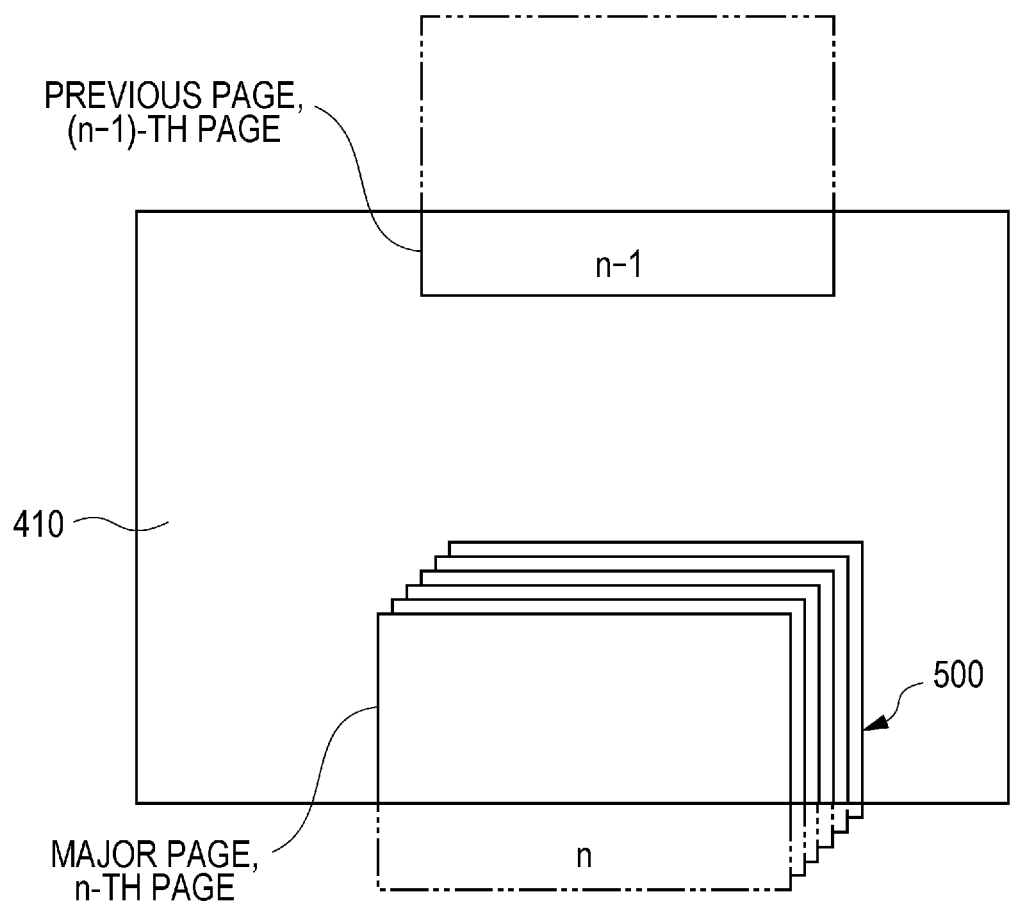
FIG. 11 is a diagram for describing a first example of display in a display area performed in a step in FIG. 5.

FIG. 11 illustrates a first example of display in the display area 410 performed in step S126 in FIG. 5. In this first example, the control unit 100 performs control to display the n-th page, which is the major page, and the (n−1)-th page, which is the previous page, side by side, and to display pages other than the pages displayed side by side such that the major page and the other pages overlap.

Figure 12:
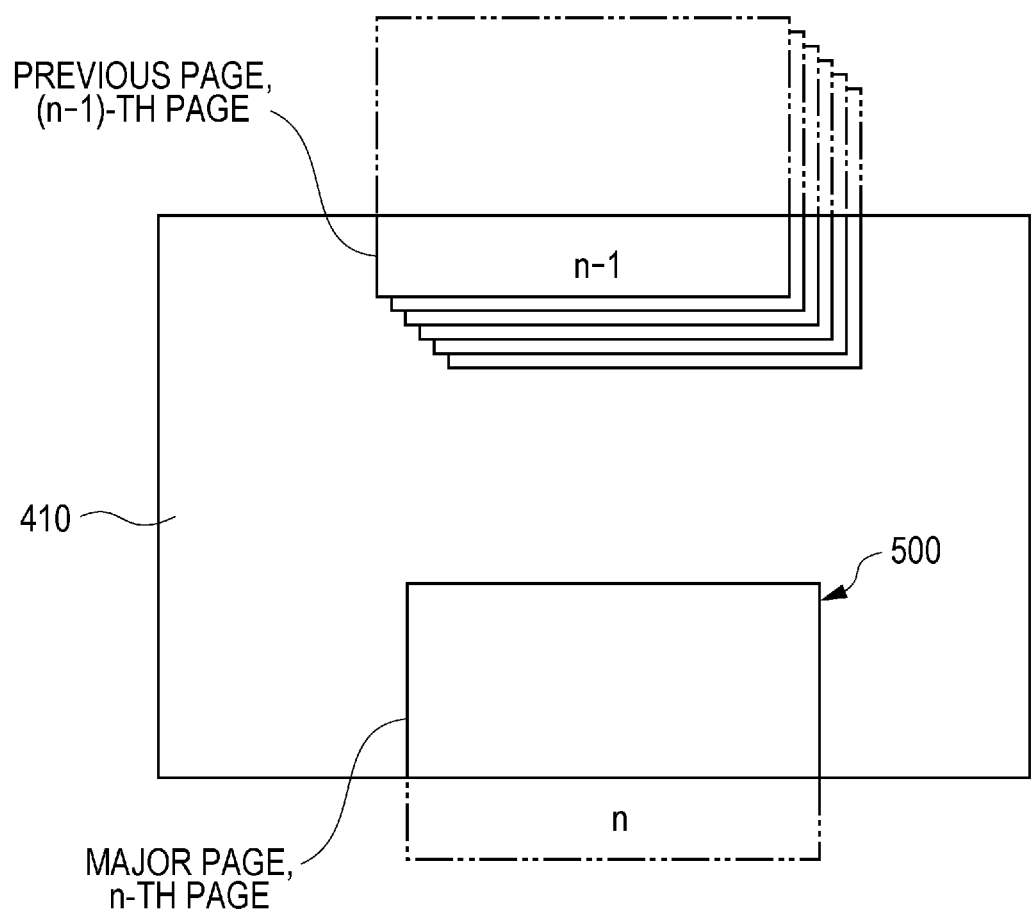
FIG. 12 is a diagram for describing a second example of display in a display area performed in the same step in FIG. 5.

FIG. 12 illustrates a second example of display in the display area 410 performed in step S126 in FIG. 5. In this second example, the control unit 100 performs control to display the n-th page, which is the major page, and the (n−1)-th page, which is the previous page, side by side, and to display pages other than the pages displayed side by side such that the previous page and the other pages overlap.

Figure 13:
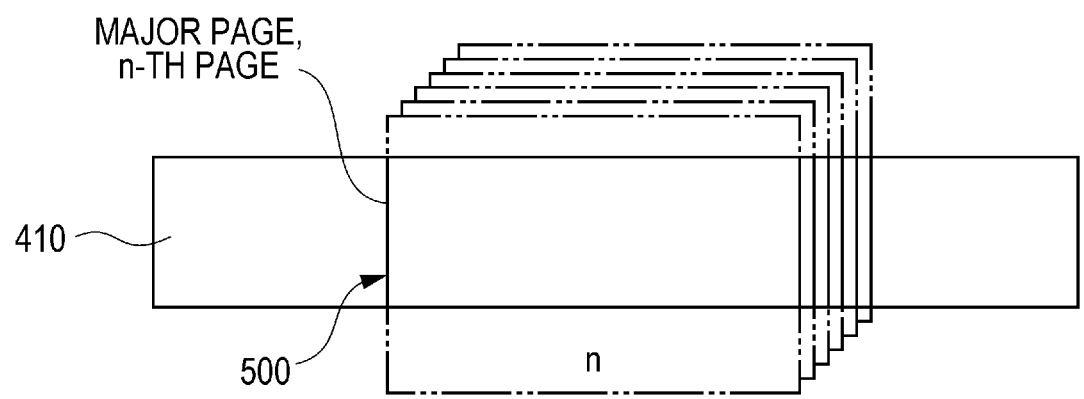
FIG. 13 is a diagram for describing an example of display in a display area performed in a step in FIG. 5.

FIG. 13 illustrates an example of display in the display area 410 performed in step S128 in FIG. 5. In this example, the control unit 100 performs control to display the n-th page, which is the major page, and to display the other pages such that the major page and the other pages overlap.

Figure 14:
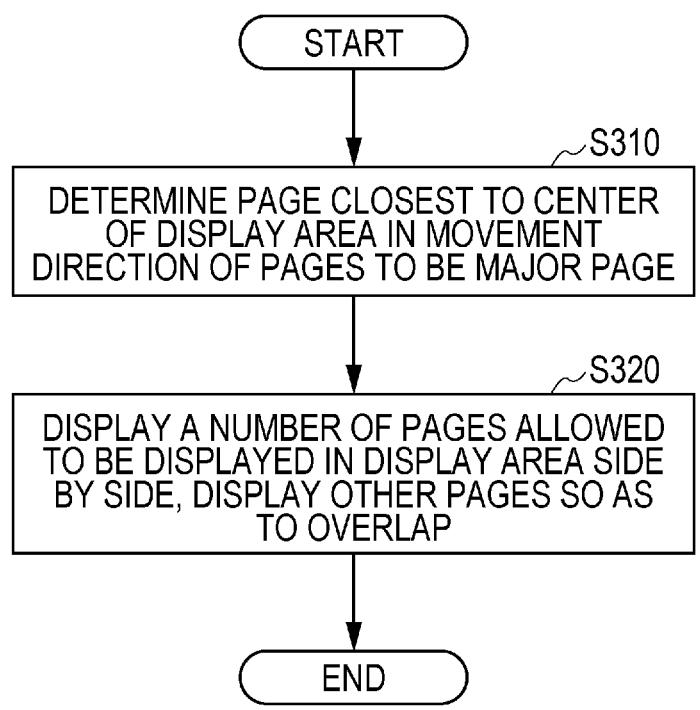
FIG. 14 is a third flowchart illustrating operations of the document display device illustrated in FIG. 1.

FIG. 14 is a third flowchart for describing operations of the document display device 10 and is a flowchart for describing the second display process (see step S300 in FIG. 4). As illustrated in FIG. 14, first, in step S310, the control unit 100 determines, among pages that are displayed in the display area 410 side by side, a page that is closest to the line segment L, which is at the center of the display screen 402 in a movement direction of the pages displayed side by side, to be a major page.

Next, in step S320, the control unit 100 performs control to display a number of pages that are allowed to be displayed in the display area 410 side by side in the display area 410 side by side, and to display pages other than the pages displayed side by side such that the pages displayed side by side and the other pages overlap.

Figure 15:
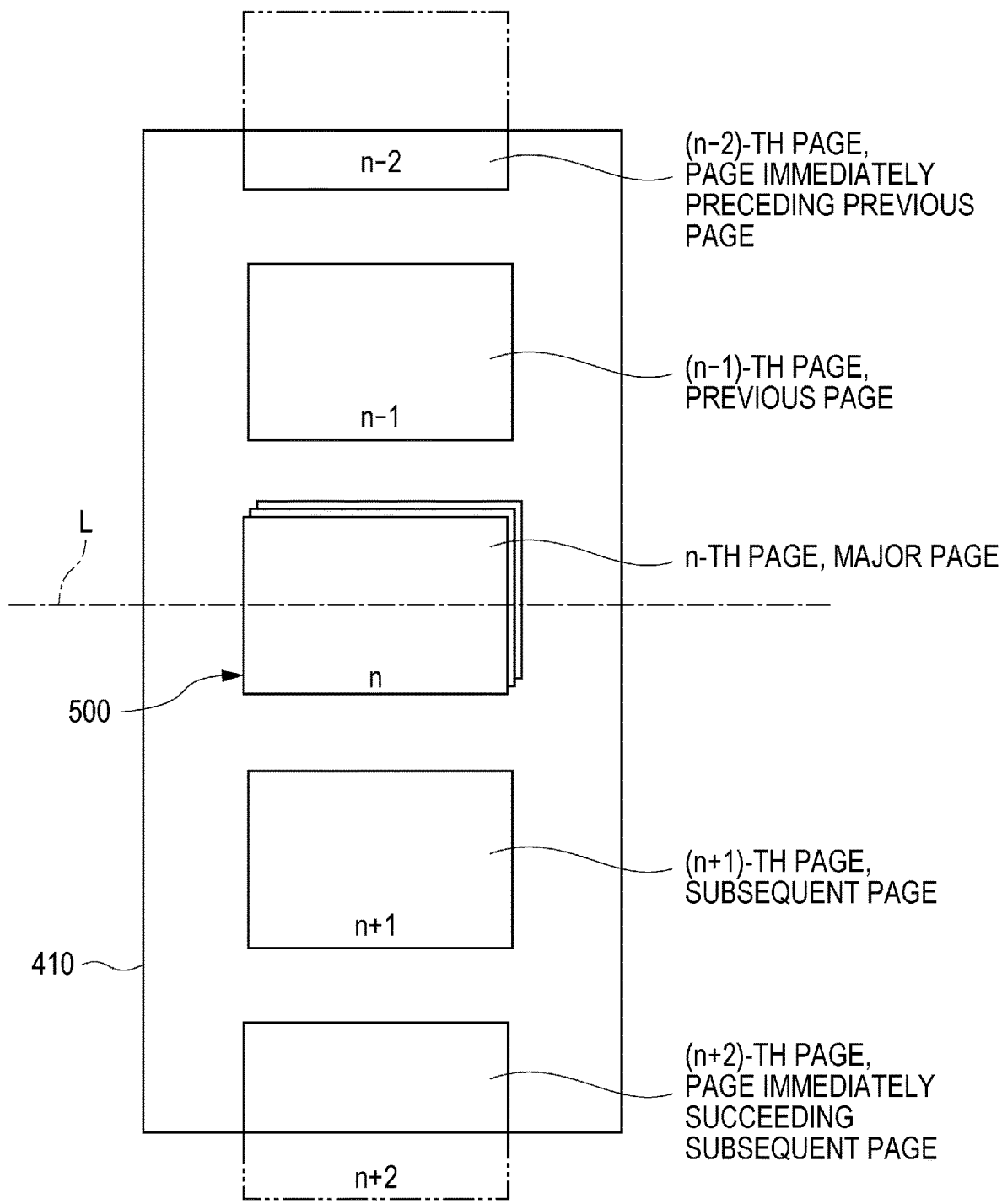
FIG. 15 is a diagram for describing a first example of display in a display area performed in a step in FIG. 14.

FIG. 15 illustrates a first example of display in the display area 410 performed in step S320 in FIG. 14. In this first example, the control unit 100 performs control to display the n-th page, which is the major page, the (n+1)-th page, which is the subsequent page, and an (n+2)-th page, which is the page immediately succeeding the subsequent page, the (n−1)-th page, which is the previous page, and an (n−2)-th page, which is the page immediately preceding the previous page, side by side, and to display pages other than the pages displayed side by side such that the n-th page, which is the major page, and the other pages overlap.

Figure 16:
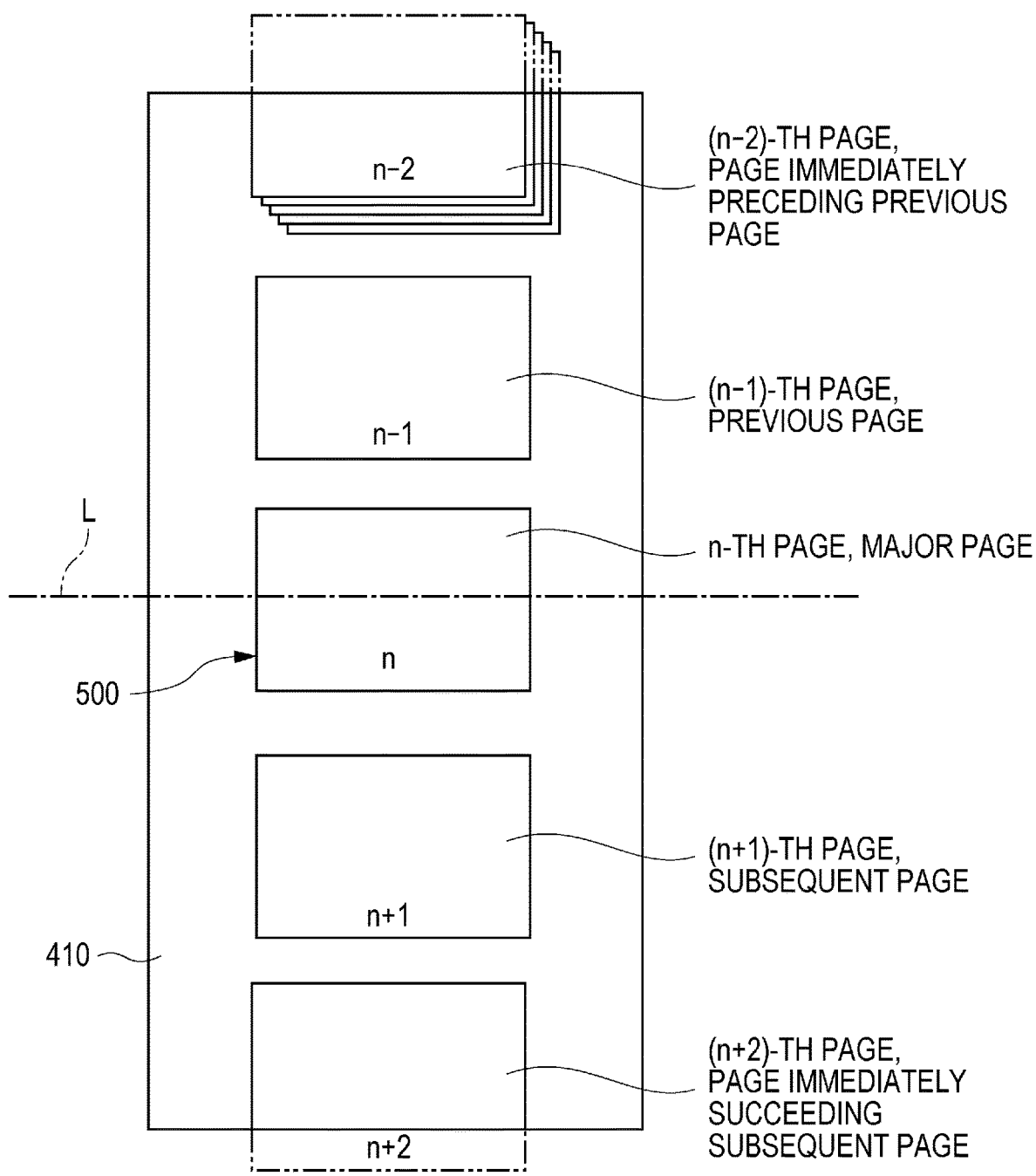
FIG. 16 is a diagram for describing a second example of display in a display area performed in the same step in FIG. 14.

FIG. 16 illustrates a second example of display in the display area 410 performed in step S320 in FIG. 14. In this second example, the control unit 100 performs control to display the n-th page, which is the major page, the (n+1)-th page, which is the subsequent page, the (n+2)-th page, which is the page immediately succeeding the subsequent page, the (n−1)-th page, which is the previous page, and the (n−2)-th page, which is the page immediately preceding the previous page, side by side, and to display the (n−2)-th page, which is the first page among the pages displayed side by side, and pages other than the pages displayed side by side so as to overlap.

Figure 17:
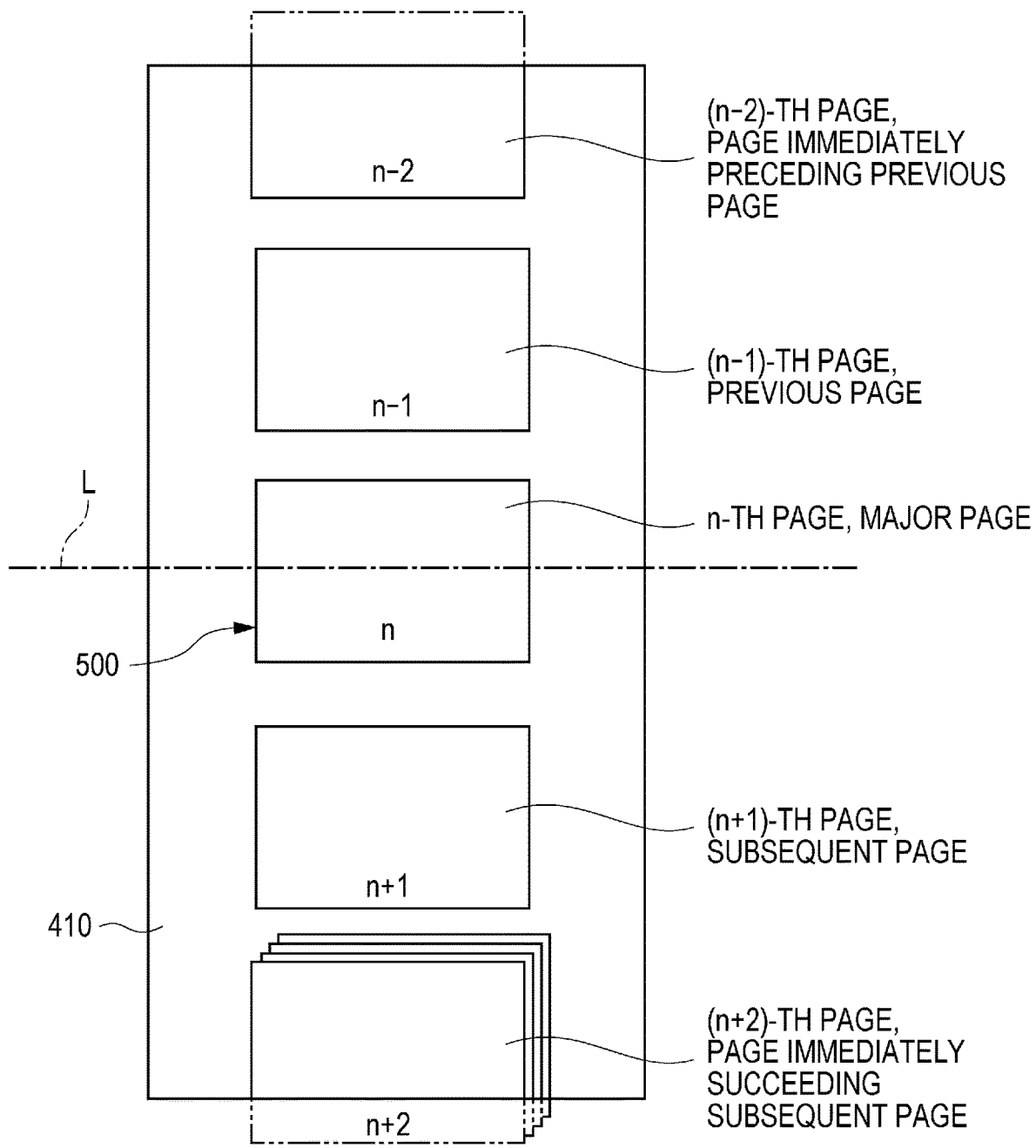
FIG. 17 is a diagram for describing a third example of display in a display area performed in the same step in FIG. 14.

FIG. 17 illustrates a third example of display in the display area 410 performed in step S320 in FIG. 14. In this third example, the control unit 100 performs control to display the n-th page, which is the major page, the (n+1)-th page, which is the subsequent page, the (n+2)-th page, which is the page immediately succeeding the subsequent page, the (n−1)-th page, which is the previous page, and the (n−2)-th page, which is the page immediately preceding the previous page, side by side, and to display the (n+2)-th page, which is the last page among the pages displayed side by side, and pages other than the pages displayed side by side so as to overlap.

Figure 18:
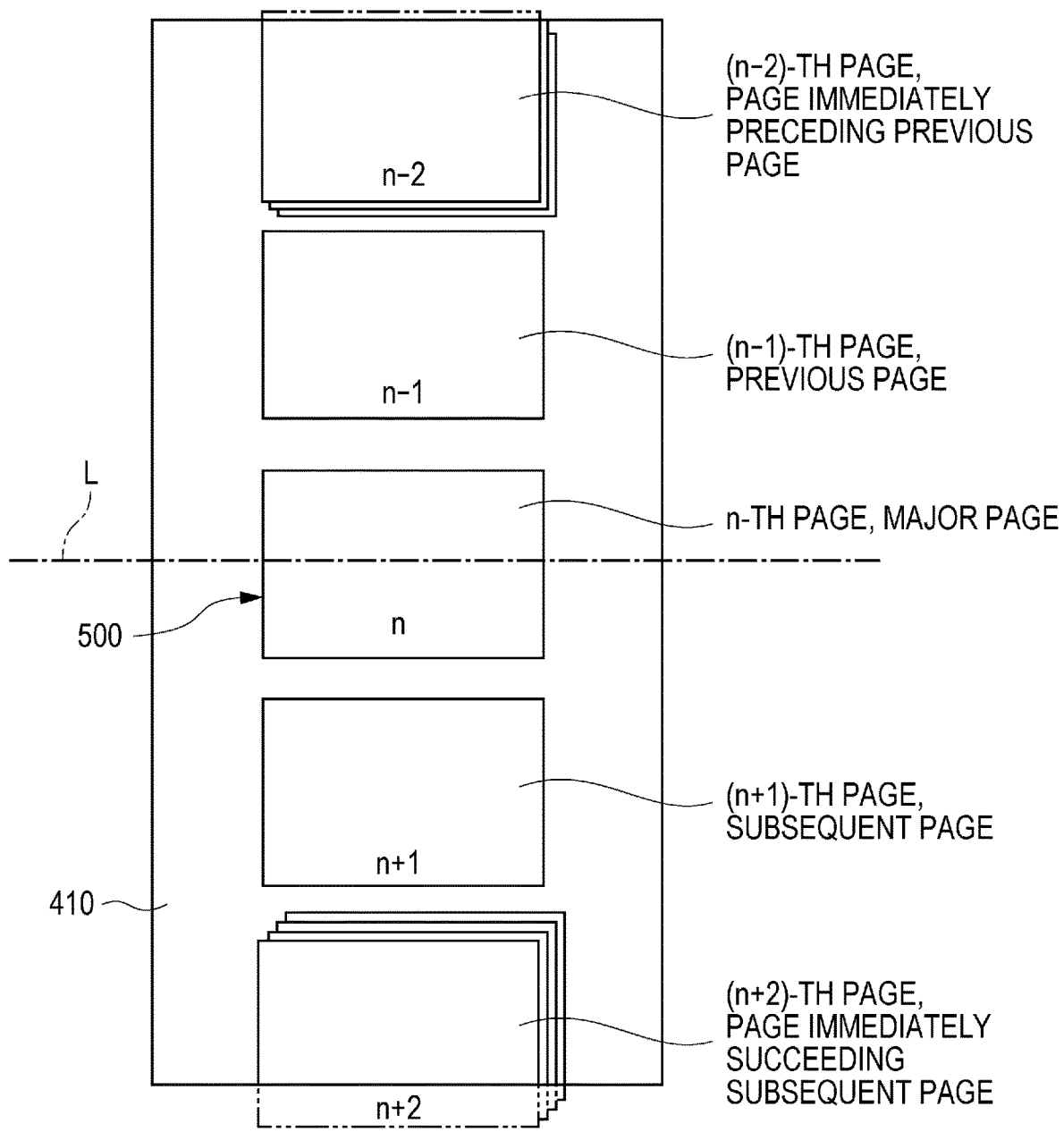
FIG. 18 is a diagram for describing a fourth example of display in a display area performed in the same step in FIG. 14.

FIG. 18 illustrates a fourth example of display in the display area 410 performed in step S320 in FIG. 14. In this fourth example, the control unit 100 performs control to display the n-th page, which is the major page, the (n+1)-th page, which is the subsequent page, the (n+2)-th page, which is the page immediately succeeding the subsequent page, the (n−1)-th page, which is the previous page, and the (n−2)-th page, which is the page immediately preceding the previous page, side by side, to group pages other than the pages displayed side by side into two groups, namely, a group of the (n−2)-th page, which is the first page among the pages displayed side by side, and a group of the (n+2)-th page, which is the last page among the pages displayed side by side, to display pages grouped into the group of the (n−2)-th page such that the (n−2)-th page and the pages grouped into the group of the (n−2)-th page overlap, and to display pages grouped into the group of the (n+2)-th page such that the (n+2)-th page and the pages grouped into the group of the (n+2)-th page overlap.

More specifically, the control unit 100 performs control to display pages that are other than the pages displayed side by side and that are previous to the (n−2)-th page such that the (n−2)-th page and the other pages overlap, and to display pages that are other than the pages displayed side by side and that are subsequent to the (n+2)-th page such that the (n+2)-th page and the other pages overlap.

FIGS. 19A and 19B and FIGS. 20A and 20B respectively illustrate a first example and a second example of movement of pages of the document data 500 displayed in the display area 410. The first example and the second example are provided for describing changes in a display format in the display area 410 when a content-displayed page in which a portion displayed in the display area 410 is largest changes from one content-displayed page to another content-displayed page.

The pages of the document data 500 displayed in the display area 410 move within the display area 410 as the document data 500 displayed in the display area 410 is, for example, enlarged, reduced, or scrolled. As described below, when moving the pages of the document data 500, the control unit 100 performs control to display an animation of the pages such that the pages seem to be continuously moving.

Figure 19B:
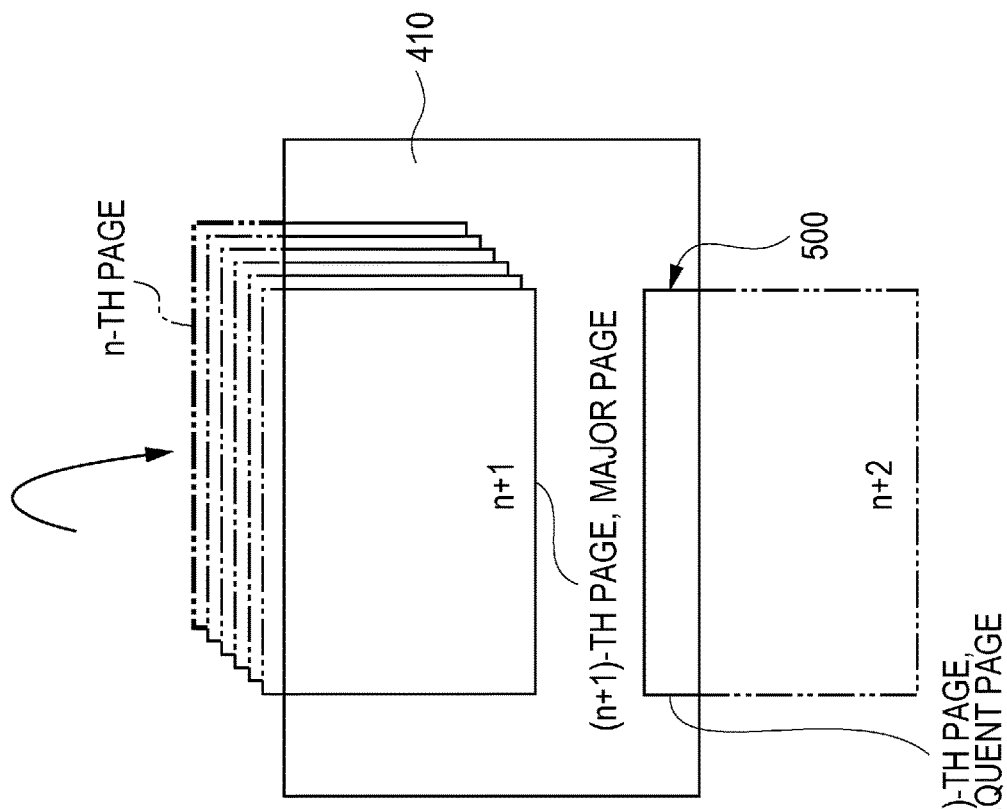
FIGS. 19A and 19B include a first set of diagrams for describing movement of pages associated with, for example, display scrolling, where
Figure 19A:
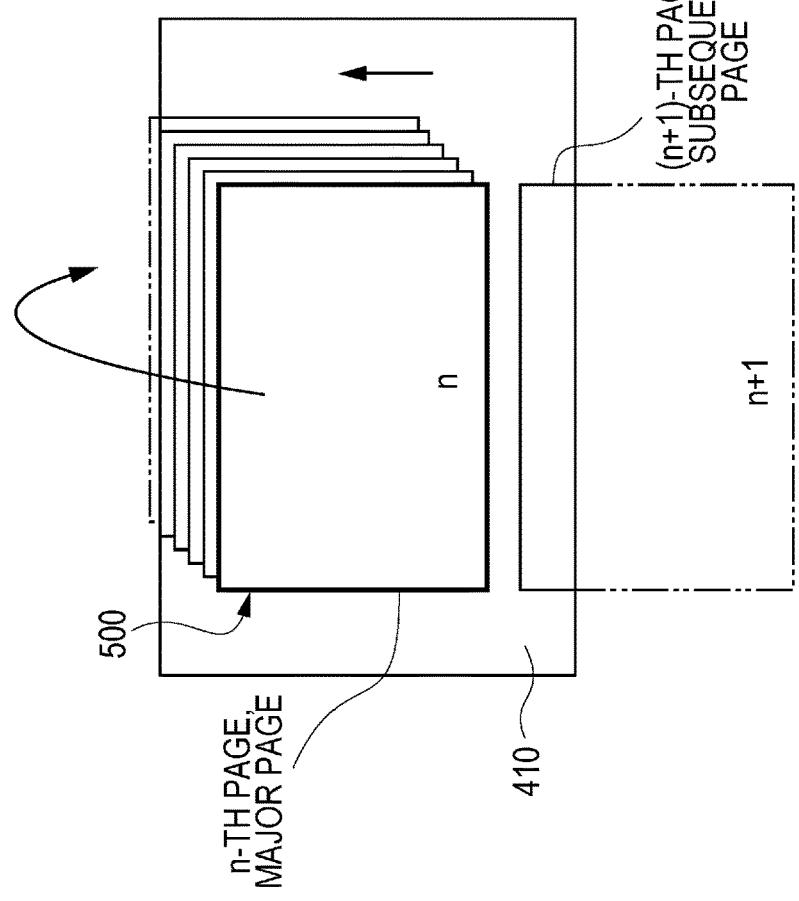

FIG. 19A illustrates a state where the control unit 100 determines the n-th page to be a major page, performs control to display the n-th page and the (n+1)-th page, which is the subsequent page, side by side, and performs control to display pages other than the pages displayed side by side such that the major page and the other pages overlap. FIG. 19B illustrates a state where the control unit 100 determines the (n+1)-th page to be a major page, performs control to display the (n+1)-th page and the (n+2)-th page, which is the page immediately succeeding the major page, side by side, and performs control to display pages other than the pages displayed side by side such that the (n+1)-th page, which is the major page, and the other pages overlap.

In the first example, in a case where an operation of scrolling display so as to move the pages upward in the display area 410 is performed in the state illustrated in FIG. 19A, the control unit 100 changes the display in the display area 410 from the state illustrated in FIG. 19A to the state illustrated in FIG. 19B in accordance with the operation. In this case, the control unit 100 performs control to move the n-th page, which is the major page in FIG. 19A, upward in the scroll direction of display so as to fade out more quickly than the other pages and to further move the n-th page downward in a direction opposite the scroll direction of display of the n-th page so as to fade into the display area 410 such that the (n+1)-th page, which is the major page after the movement illustrated in FIG. 19B, and the n-th page overlap and such that the n-th page is furthest from the (n+1)-th page.

FIG. 20A illustrates a state where the control unit 100 determines the n-th page to be a major page, performs control to display the n-th page and the (n−1)-th page, which is the page immediately preceding the major page, side by side, and performs control to display pages other than the pages displayed side by side such that the major page and the other pages overlap. FIG. 20B illustrates a state where the control unit 100 determines the (n−1)-th page to be a major page, performs control to display the (n−1)-th page and the n-th page, which is the page immediately succeeding the major page, side by side, and performs control to display pages other than the pages displayed side by side such that the (n−1)-th page, which is the major page, and the other pages overlap.

In the second example, in a case where an operation of scrolling display so as to move the pages downward in the display area 410 is performed in the state illustrated in FIG. 20A, the control unit 100 changes the display in the display area 410 from the state illustrated in FIG. 20A to the state illustrated in FIG. 20B in accordance with the operation. In this case, the control unit 100 performs control to move the n-th page, which is the major page in FIG. 20A, downward in the scroll direction of display so as to fade out more quickly than the other pages and to further move the n-th page upward in a direction opposite the scroll direction of display of the n-th page so as to fade into the display area 410 such that the (n−1)-th page, which is the major page after the movement illustrated in FIG. 20B, and the n-th page overlap and such that the n-th page is immediately behind the (n−1)-th page.

In the above description, movement of pages is described regarding the example case where display is scrolled in the state where two pages are displayed in the display area 410. Regarding an example case where display is scrolled in a state where three or more pages are displayed in the display area 410 or an example case where pages are enlarged or reduced within the display area 410, when the pages are moved within the display area 410, the control unit 100 similarly displays an animation of the pages such that the pages seem to be continuously moving.

Figure 21:
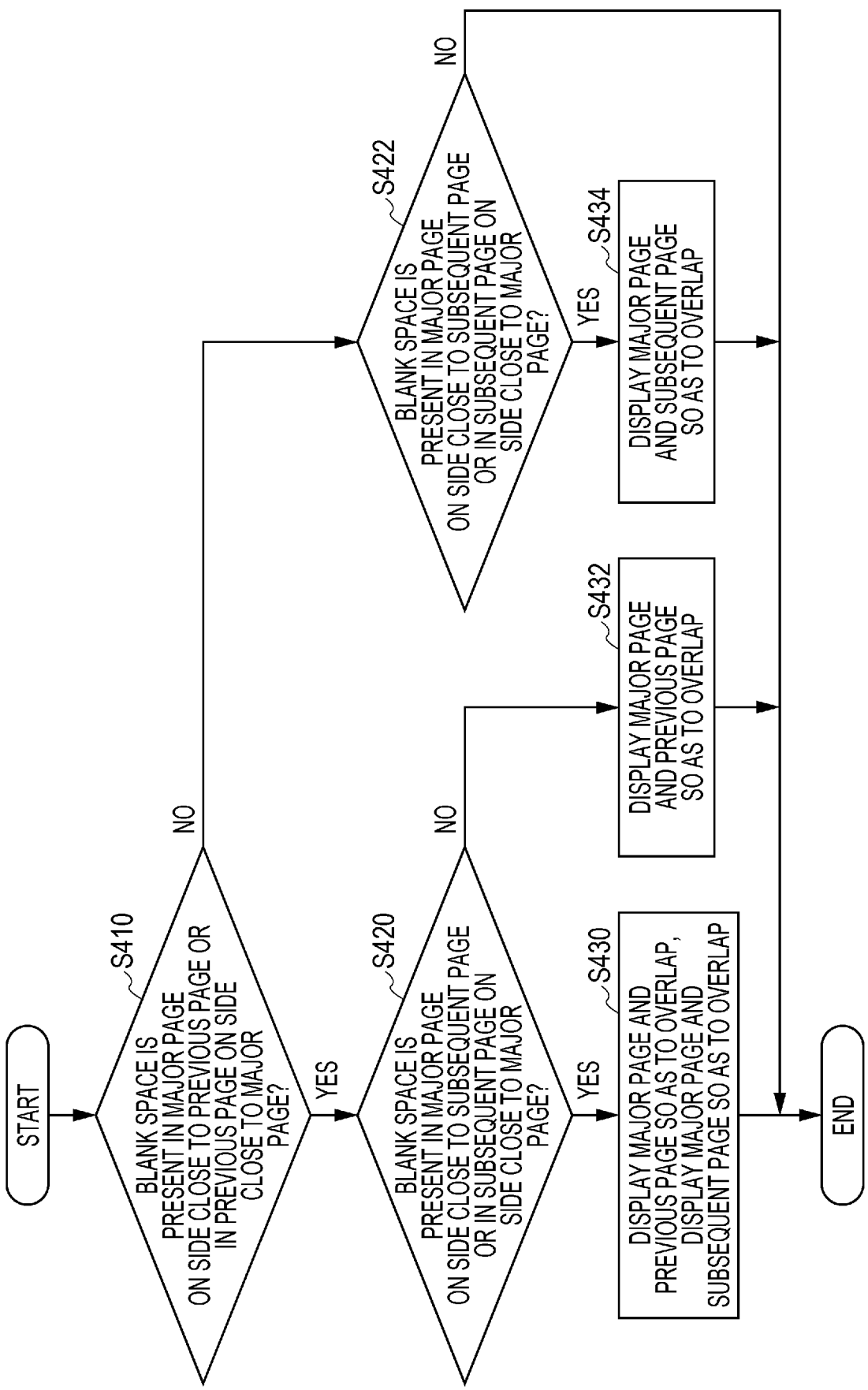
FIG. 21 is a fourth flowchart illustrating operations of the document display device illustrated in FIG. 1 and is a flowchart for describing an operation of displaying pages such that a page is overlaid on an inside-page blank space.

FIG. 21 is a fourth flowchart for describing control of the document display device 10 and is a flowchart for describing control for displaying pages of the document data 500 such that a page is overlaid on another page in an inside-page blank space of the other page. FIGS. 22A and 22B, FIGS. 23A and 23B, and FIGS. 24A and 24B are diagrams for supplementing description of the control illustrated in FIG. 21. Hereinafter, description is given while assuming an example case where the n-th page is a major page.

For example, the control unit 100 starts a series of control operations illustrated in FIG. 21 simultaneously with the start of step S122, step S124, and step S126 (see FIG. 5). First, in step S410, the control unit 100 determines whether an inside-page blank space Pt is present in the major page on a side close to the previous page (the (n−1)-th page) and whether an inside-page blank space Pb is present in the previous page on a side close to the major page. If at least one of the inside-page blank space Pt of the major page and the inside-page blank space Pb of the previous page is present (Yes in step S410), the flow proceeds to step S420. If the inside-page blank space Pt of the major page or the inside-page blank space Pb of the previous page is not present (No in step S410), the flow proceeds to step S422.

Here, an inside-page blank space is a portion in a page in which, for example, no character or no image is displayed. For example, in a case where a page includes a supplementary information display area for displaying, for example, the page number, the document name, and/or the document creation date (that is, a header and/or a footer) in the upper end portion and/or the lower end portion, such a supplementary information display area is regarded as a blank space, and control may be performed such that pages overlap in the blank space.

Figure 22A:
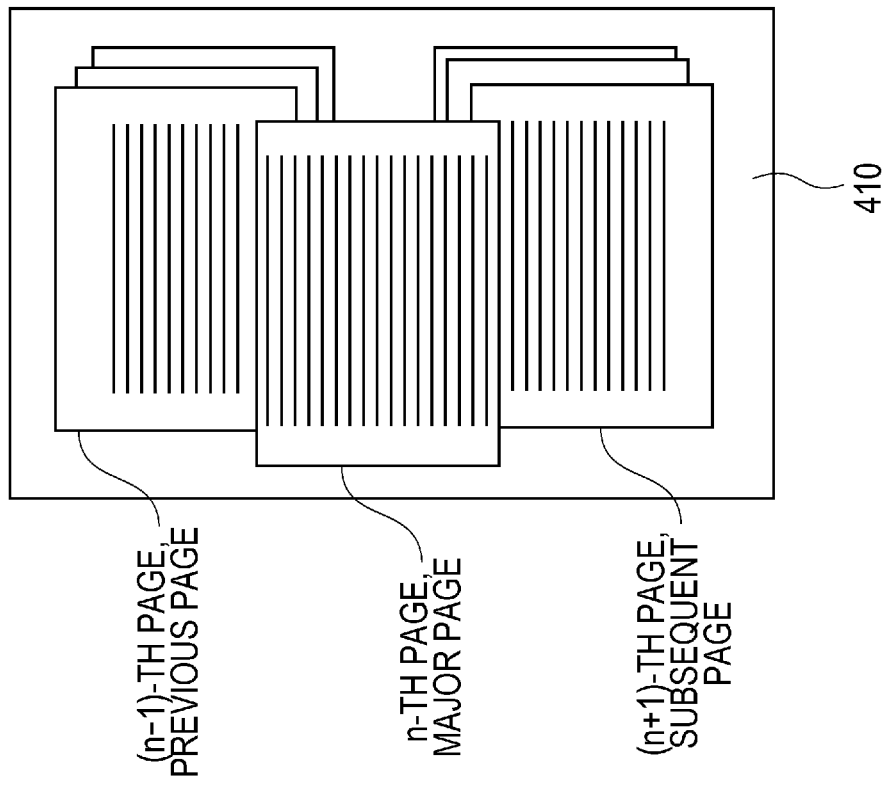
FIG. 22A is a diagram illustrating a first example of displaying pages such that a page is not overlaid on an inside-page blank space.

In the example illustrated in FIG. 22A, the inside-page blank space Pt is not present in the n-th page, which is the major page, and the inside-page blank space Pb is present in the (n−1)-th page, which is the previous page. Therefore, the flow proceeds to step S420. In the example illustrated in FIG. 23A, the inside-page blank space Pb is not present in the (n−1)-th page, which is the previous page, and the inside-page blank space Pt is present in the n-th page, which is the major page. Therefore, the flow proceeds to step S420.

In step S420, the control unit 100 determines whether the inside-page blank space Pb is present in the major page on a side close to the subsequent page (the (n+1)-th page) and whether the inside-page blank space Pt is present in the subsequent page on a side close to the major page. If at least one of the inside-page blank space Pb of the major page and the inside-page blank space Pt of the subsequent page is present (Yes in step S420), the flow proceeds to step S430. If the inside-page blank space Pb of the major page or the inside-page blank space Pt of the subsequent page is not present (No in step S420), the flow proceeds to step S432.

In the example illustrated in FIG. 22A, the inside-page blank space Pb is not present in the n-th page, which is the major page, and the inside-page blank space Pt is present in the (n+1)-th page, which is the subsequent page. Therefore, the flow proceeds to step S430. In the example illustrated in FIG. 23A, the inside-page blank space Pb is not present in the n-th page, which is the major page, and the inside-page blank space Pt is not present in the (n+1)-th page, which is the subsequent page. Therefore, the flow proceeds to step S432.

In step S422, the control unit 100 determines whether the inside-page blank space Pb is present in the major page on a side close to the subsequent page (the (n+1)-th page) and whether the inside-page blank space Pt is present in the subsequent page on a side close to the major page. If at least one of the inside-page blank space Pb of the major page and the inside-page blank space Pt of the subsequent page is present (Yes in step S422), the flow proceeds to step S434. If the inside-page blank space Pb of the major page or the inside-page blank space Pt of the subsequent page is not present (No in step S422), the series of processes ends.

Figure 22B:
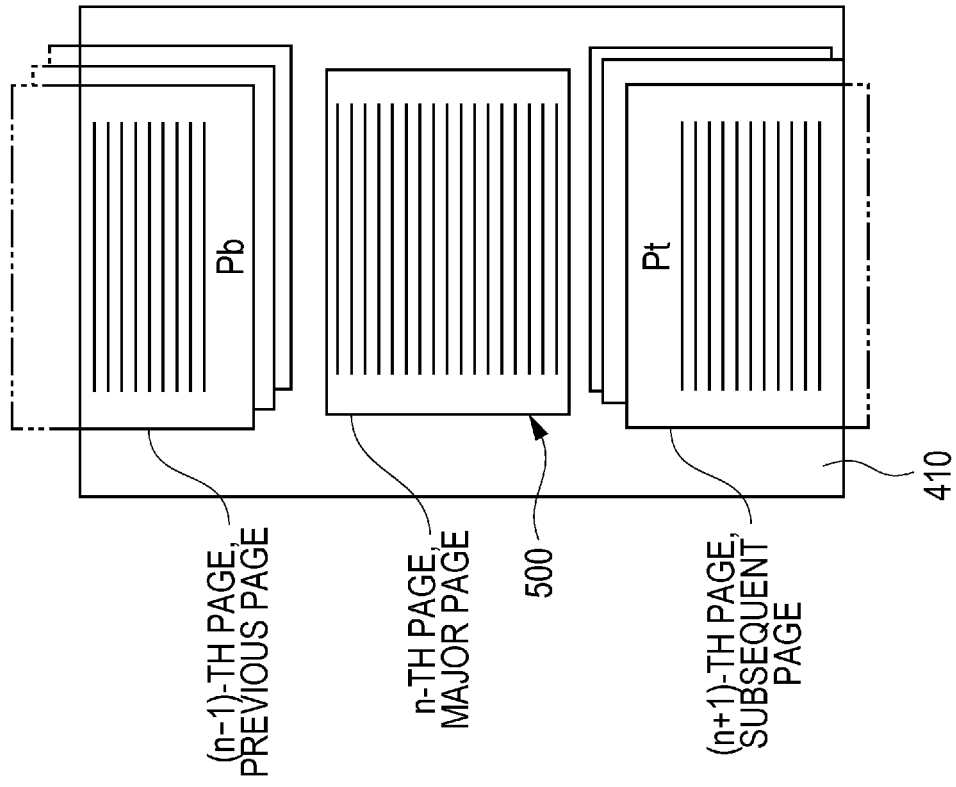
FIG. 22B is a diagram illustrating a first example of displaying pages such that a page is overlaid on an inside-page blank space.

In step S430, as illustrated in, for example, FIG. 22B, the control unit 100 performs control to display the n-th page, which is the major page, and the (n−1)-th page, which is the previous page, so as to overlap and to display the n-th page, which is the major page, and the (n+1)-th page, which is the subsequent page, so as to overlap. In this case, the control unit 100 performs control to display pages so as to overlap such that a page is overlaid on another page in the inside-page blank space Pt of the other page and such that a page is overlaid on another page in the inside-page blank space Pb of the other page. In a case where the previous page has the inside-page blank space Pb and the major page has the inside-page blank space Pt, any one of the previous page and the major page may be overlaid on the other and displayed. In a case where the major page has the inside-page blank space Pb and the subsequent page has the inside-page blank space Pt, any one of the major page and the subsequent page may be overlaid on the other and displayed.

Figure 23B:
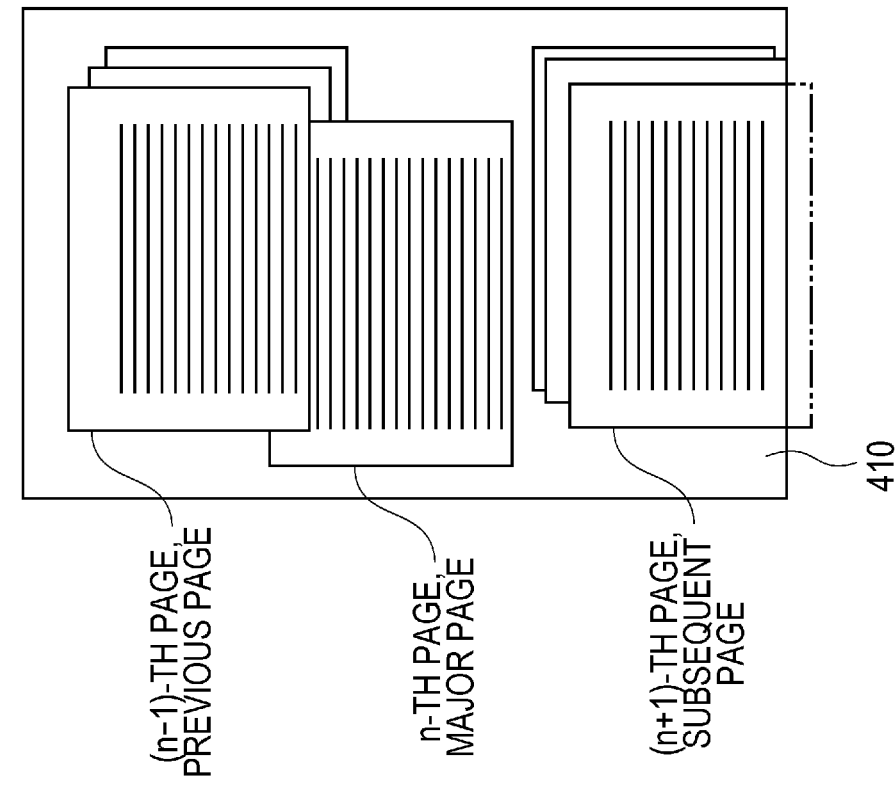
FIG. 23B is a diagram illustrating a second example of displaying pages such that a page is overlaid on an inside-page blank space.
Figure 23A:
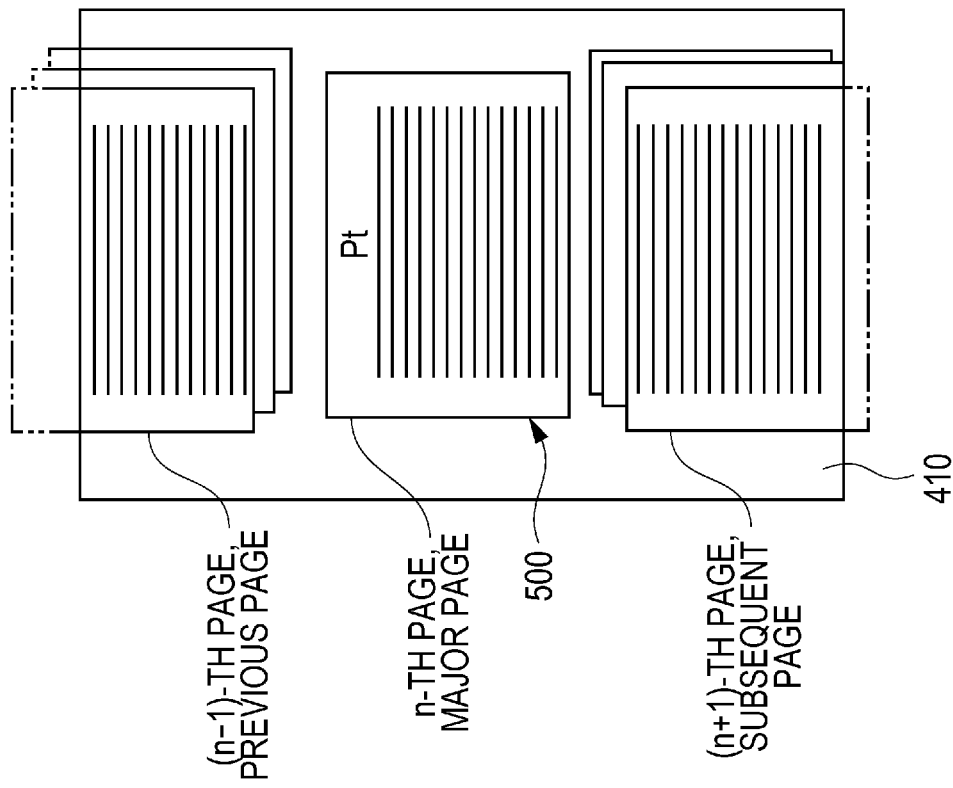
FIG. 23A is a diagram illustrating a second example of displaying pages such that a page is not overlaid on an inside-page blank space.

In step S432, as illustrated in, for example, FIG. 23B, the control unit 100 performs control to display the n-th page, which is the major page, and the (n−1)-th page, which is the previous page, so as to overlap. In this case, the control unit 100 performs control to display the pages such that the major page is overlaid on the previous page in the inside-page blank space Pb of the previous page or such that the (n−1)-th page, which is the previous page, is overlaid on the major page in the inside-page blank space Pt of the major page.

Figure 24B:
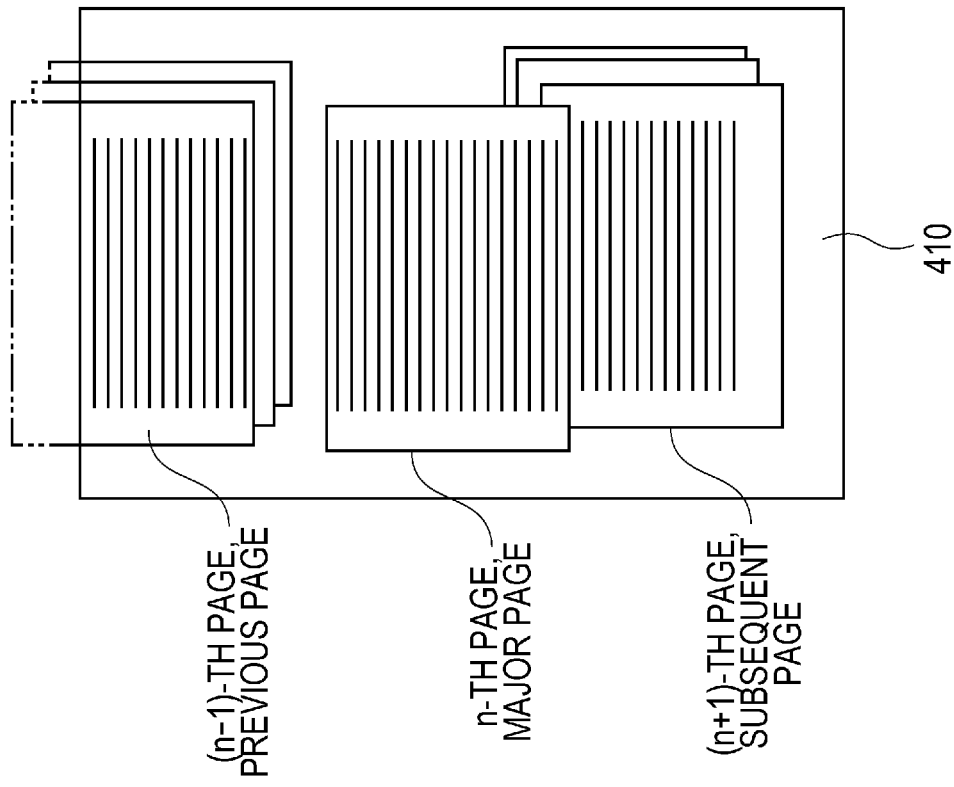
FIG. 24B is a diagram illustrating a third example of displaying pages such that a page is overlaid on an inside-page blank space.
Figure 24A:
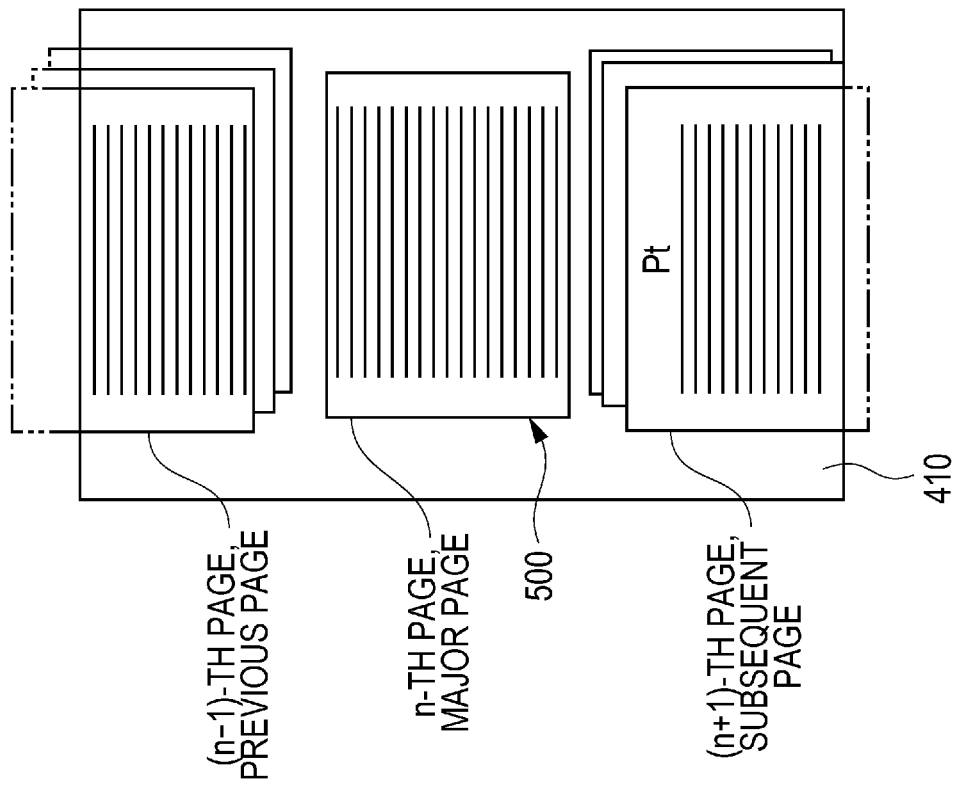
FIG. 24A is a diagram illustrating a third example of displaying pages such that a page is not overlaid on an inside-page blank space.

In step S434, as illustrated in, for example, FIG. 24B, the control unit 100 performs control to display the n-th page, which is the major page, and the (n+1)-th page, which is the subsequent page, so as to overlap. In this case, the control unit 100 performs control to display the pages such that the subsequent page is overlaid on the major page in the inside-page blank space Pb of the major page or such that the major page is overlaid on the subsequent page in the inside-page blank space Pt of the subsequent page.

Figure 25:
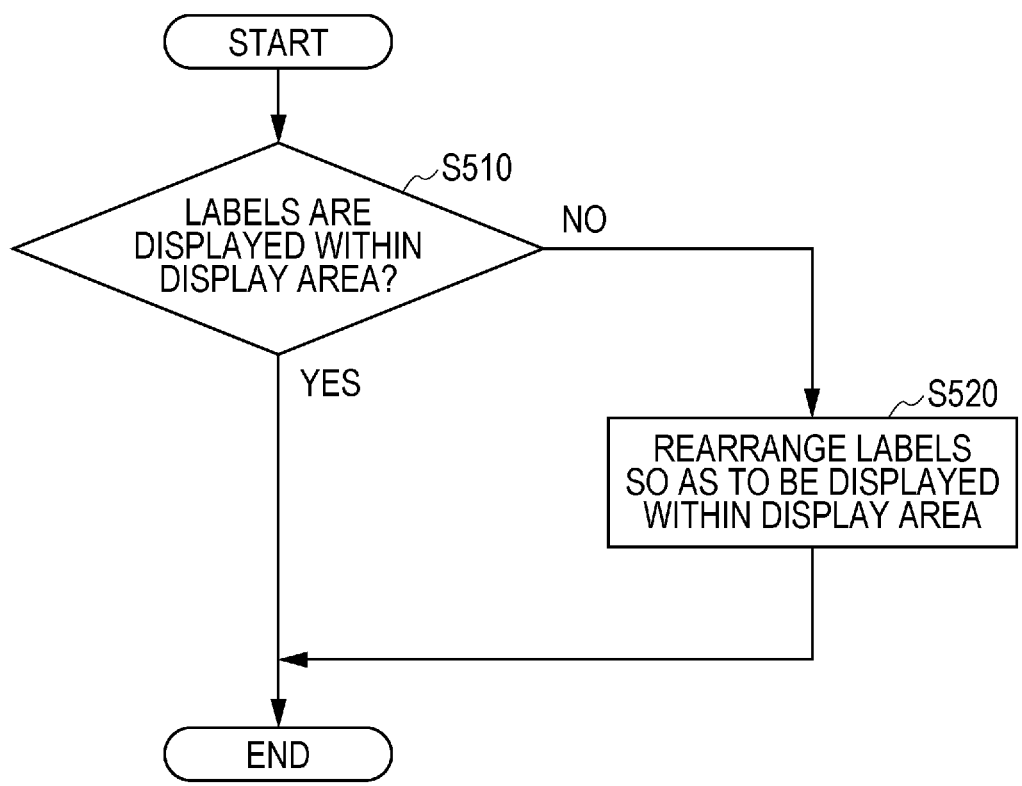
FIG. 25 is a fifth flowchart illustrating operations of the document display device illustrated in FIG. 1 and is a flowchart for describing movement of labels.
Figure 26B:
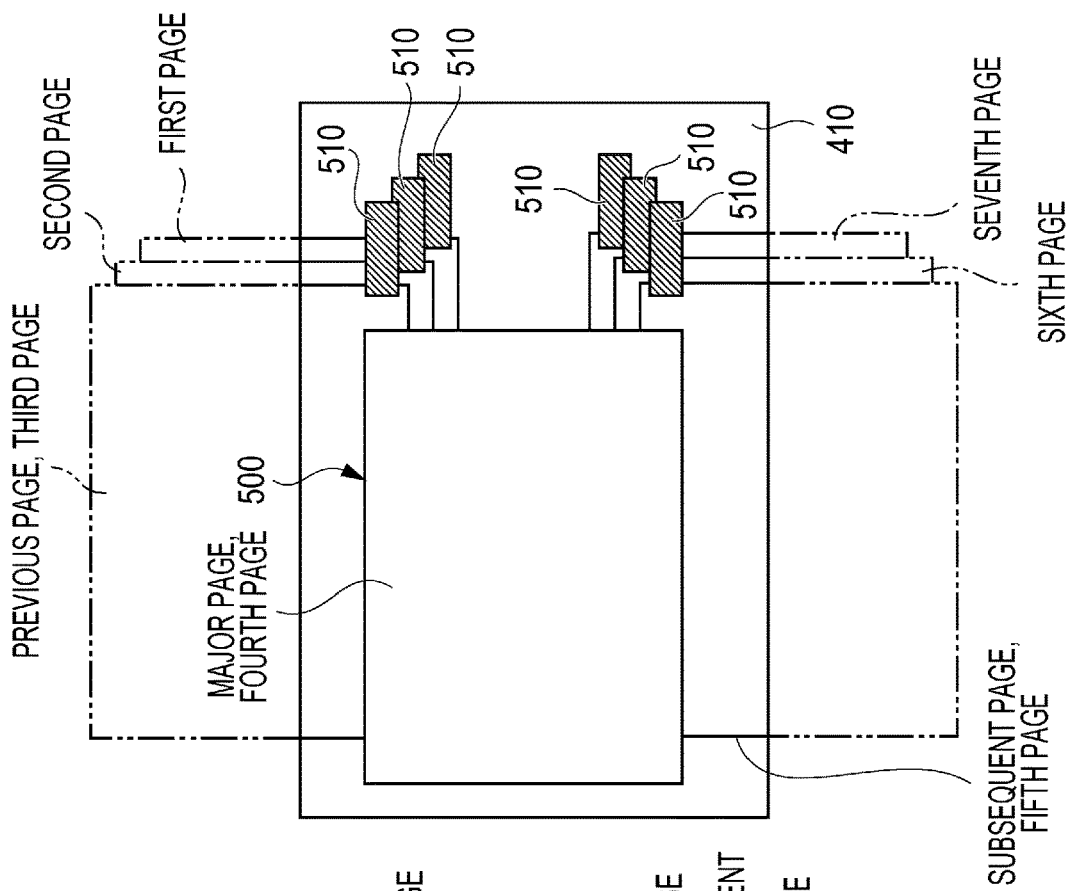
FIGS. 26A and 26B are diagrams for describing movement of labels, where
Figure 26A:
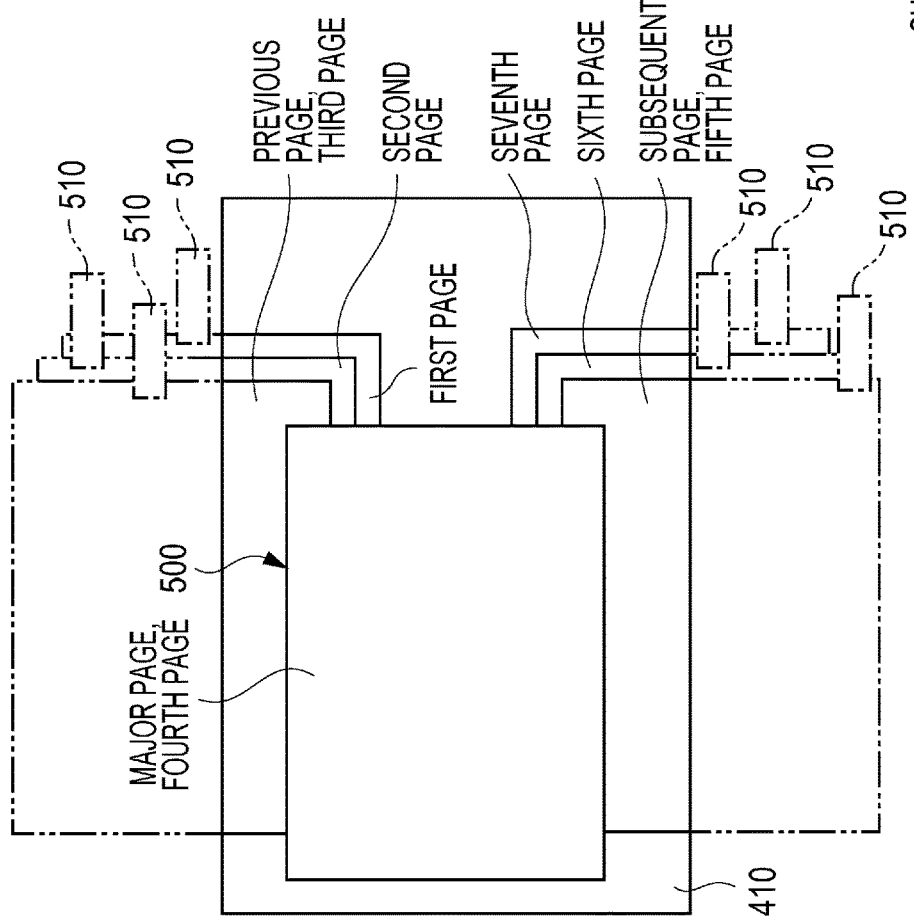

FIG. 25 is a fifth flowchart for describing control of the document display device 10 and is a flowchart for describing control performed in a case of displaying one or more labels attached to one or more of the pages of the document data 500. FIGS. 26A and 26B are diagrams for supplementing description of the control illustrated in FIG. 25. Hereinafter, description is given while assuming an example case where the document data 500 has seven pages, and the control unit 100 determines a fourth page to be a major page and a third page to be the previous page, performs control to display the third page, a first page, and a second page so as to overlap, determines a fifth page to be the subsequent page, performs control to display the fifth page, a sixth page, and a seventh page so as to overlap, and performs control to display a label 510 that is attached to each of the first page, the second page, the third page, the fifth page, the sixth page, and the seventh page, as illustrated in FIGS. 26A and 26B.

Here, the label 510 is attached to each page in accordance with an operation by an operator. The operator specifies a desired position in a vertical direction, which is a direction identical to the direction in which the pages are arranged and displayed in the display area 410, and the label 510 is attached to the position specified by the operator so as to extend from, for example, the right side of the page.

For example, the control unit 100 starts a series of control operations illustrated in FIG. 25 simultaneously with the start of step S122, step S124, and step S126 (see FIG. 5). In step S510, the control unit 100 determines whether the label 510 that is attached to a page at a position not displayed in the display area 410 when not performing control for moving labels is present. If the control unit 100 determines that at least one label 510 is attached to a page at a position not displayed in the display area 410 (No in step S510), the flow proceeds to step S520. If the control unit 100 determines that all of the labels 510 are attached to pages at positions displayed in the display area 410 (Yes in step S510), the series of processes ends.

In step S520, the control unit 100 performs control to move the labels 510 to display the labels 510 within the display area 410, as illustrated in FIG. 26B. In this case, the control unit 100 may move the labels 510 such that, for example, the label 510 attached to a page positioned on a further side is moved so as to be closer to the center of the display area 410 in the direction in which the pages are arranged (the vertical direction). Further, in order to allow the operator to easily view all of the labels 510, it is desirable that the control unit 100 perform control to move the plural labels 510 such that the labels 510 do not completely overlap.

When display is changed and a position of a page to which the label 510 was attached becomes displayed in the display area 410 accordingly, it is desirable that the control unit 100 perform control to move the label 510 to the position to which the label 510 was originally attached.

Figure 27:
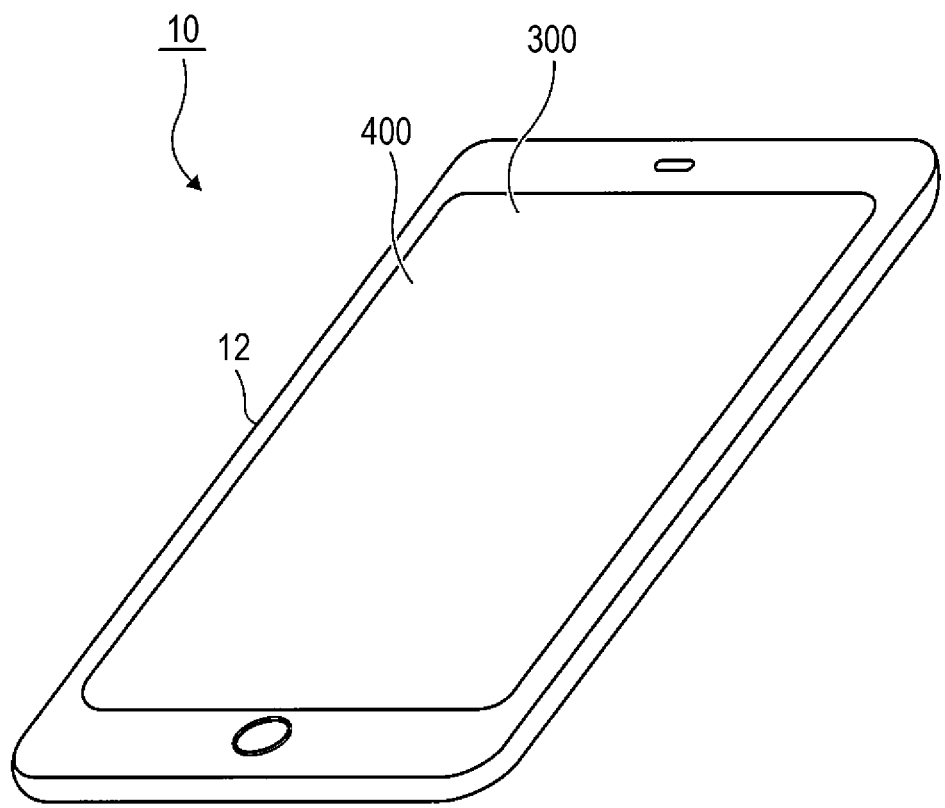
FIG. 27 is a diagram illustrating an external view of a document display device according to a second exemplary embodiment of the present invention.

FIG. 27 illustrates the document display device 10 used in a second exemplary embodiment of the present invention. The document display device 10 used in the first exemplary embodiment described above includes the control unit 100, and the control unit 100 controls display performed by the display 400. In the document display device 10 used in the second exemplary embodiment, the display 400 is controlled by an external control unit.

As illustrated in FIG. 27, the document display device 10 includes the document display device system unit 12, the operation unit 300 provided on the document display device system unit 12, and the display 400 provided on the document display device system unit 12. As the document display device 10, it is possible to use, for example, a tablet terminal. As the display 400, it is possible to use, for example, a liquid crystal display panel. As the operation unit 300, it is possible to use, for example, a touch panel.

FIG. 28 illustrates a hardware configuration of the document display device 10 illustrated in FIG. 27 and a hardware configuration of a control device 900, which is, for example, a server. As illustrated in FIG. 28, the document display device 10 includes a communication interface 120, the operation unit 300 described above, the display 400 described above, and the control unit 100 that controls these units. The document display device 10 is connected to a network 830 via a communication device 810 capable of communicating with the communication interface 120 and via an Internet communication network 820.

The control device 900 includes a control unit 910, a communication interface 920, and a storage unit 930 and is connected to the network 830 via the communication interface 920. The storage unit 930 stores a program used by the control unit 910 for controlling the display 400 and data to be displayed by the display 400.

The document display device 10 configured as described above is capable of communicating with the control device 900, and the control unit 910 controls the display 400 in response to an operator operating the operation unit 300. The control of the display 400 by the control unit 910 is similar to the control of the display 400 by the control unit 100 according to the first exemplary embodiment, and therefore, a detailed description thereof is omitted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document display device comprising:
   a display; and
   a processor programmed to:
      control a display of document data constituted by a plurality of pages on the display such that:
         at least two consecutive pages of the document data are displayed side by side on the display with contents included in the at least two consecutive pages being displayed, and
         remaining one or more pages in the document data are displayed on the display so as to overlap with one another without contents included in the remaining one or more pages being displayed;
      determine whether a number of the at least two consecutive pages whose contents are displayed on the display is equal to or less than a predefined threshold;
      when the number is equal to or less than the predefined threshold, arrange the at least two consecutive pages and the remaining one or more pages on the display using a first display process; and
      when the number is greater than the predefined threshold, arrange the at least two consecutive pages and the remaining one or more pages on the display using a second display process different from the first display process, wherein
      each of the first display process and the second display process controls at least the following:
         (i) which one of the at least two consecutive pages is a major page, and
         (ii) which one of the remaining one or more pages is stacked under the major page determined in (i).

2. The document display device according to claim 1, wherein the processor is programmed to:
   arrange the at least two consecutive pages and the remaining one or more pages on the display so that one of the at least two consecutive pages whose contents are displayed overlaps with the remaining one or more pages whose contents are not displayed.

3. The document display device according to claim 1, wherein the processor is programmed to:
   control the display to display, in different display formats,
      (i) a first page, among the plurality of pages, that is other than the at least two consecutive pages whose contents are displayed and that is previous to the at least two consecutive pages in a page order, and
      (ii) a second page, among the plurality of pages, that is other than the at least two consecutive pages whose contents are displayed and that is subsequent to the at least two consecutive pages in the page order.

4. The document display device according to claim 3, wherein the processor is programmed to:
   control the display to display, in different colors,
      the first page, and
      the second page.

5. The document display device according to claim 1, wherein the processor is programmed to:
   display a first page, among the plurality of pages, that is other than the at least two consecutive pages whose contents are displayed and that is previous to the at least two consecutive pages in a page order, such that the first page overlaps with one of the at least two consecutive pages; and
   display a second page, among the plurality of pages, that is other than the at least two consecutive pages whose contents are displayed and that is subsequent to the at least two consecutive pages in the page order, such that the second page overlaps with another one of the at least two consecutive pages.

6. The document display device according to claim 1, wherein the processor is programmed to:
   change a display format when a content-displayed page in which a portion that is displayed on the display is largest switches from one of the at least two consecutive pages to another one of the at least two consecutive pages.

7. The document display device according to claim 6, wherein the processor is programmed to:
   control the display to display, in an overlapping manner,
      (i) a third page which is the content-displayed page in which the portion displayed on the display is largest before the switching, the third page being assumed to be a page other than the at least two consecutive pages after the switching, and
      (ii) one of the at least two consecutive pages.

8. The document display device according to claim 6, wherein the processor is programmed to:
   switch a content-displayed page that overlaps with the remaining one or more pages from the one of the at least two consecutive pages to the another one of the at least two consecutive pages.

9. The document display device according to claim 1, wherein the processor is programmed to:

control the display to perform display while switching between a plurality of display states; and upon switching from one display state to another display state, move a page on the display such that the page seems to be continuously moving.

10. The document display device according claim 1, wherein the processor is programmed to:

display the at least two consecutive pages such that one of the at least two consecutive pages is overlaid on another one of the at least two consecutive pages in an inside-page blank space of the another one on a side close to the one of the at least two consecutive pages.

11. The document display device according to claim 1, wherein the processor is programmed to:

display one or more labels attached to one or more of the plurality of pages;

move a label that is attached to a certain page among the plurality of pages from a first position not displayed on the display to a second position on the certain page that is displayed on the display; and display the label.

12. The document display device according to claim 1, wherein the processor is programmed to:

under the first display process, determine the major page to be a page with a largest amount of content displayed on the display among the at least two consecutive pages whose contents are displayed; and under the second display process, determine the major page to be a page that is closest to a center line of the display among the at least two consecutive pages whose contents are displayed, wherein the at least two consecutive pages and the remaining one or more pages are arranged in accordance with the determined major page.

13. A non-transitory computer readable medium storing a program causing a computer to execute a process for document display, the process comprising:

controlling a display of document data constituted by a plurality of pages on a display such that:

at least two consecutive pages of the document data are displayed side by side on the display with contents included in the at least two consecutive pages being displayed, and remaining one or more pages in the document data are displayed on the display so as to overlap with one another without contents included in the remaining one or more pages being displayed;

determining whether a number of the at least two consecutive pages whose contents are displayed on the display is equal to or less than a predefined threshold;

when the number is equal to or less than the predefined threshold, arranging the at least two consecutive pages and the remaining one or more pages on the display using a first display process; and when the number is greater than the predefined threshold, arranging the at least two consecutive pages and the remaining one or more pages on the display using a second display process different from the first display process, wherein each of the first display process and the second display process controls at least the following:

(i) which one of the at least two consecutive pages is a major page, and (ii) which one of the remaining one or more pages is stacked under the major page determined in (i).

* * * * *